US012627336B2

(12) United States Patent
Sheng et al.

(10) Patent No.: US 12,627,336 B2
(45) Date of Patent: May 12, 2026

(54) ELECTRONIC DEVICE AND METHOD FOR WIRELESS COMMUNICATION, AND COMPUTER READABLE STORAGE MEDIUM

(71) Applicant: Sony Group Corporation, Tokyo (JP)

(72) Inventors: Bin Sheng, Nanjing (CN); Li Zhang, Nanjing (CN); Tingting Fan, Beijing (CN); Chen Sun, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 26 days.

(21) Appl. No.: 18/835,382

(22) PCT Filed: Feb. 17, 2023

(86) PCT No.: PCT/CN2023/076697
§ 371 (c)(1),
(2) Date: Aug. 2, 2024

(87) PCT Pub. No.: WO2023/160467
PCT Pub. Date: Aug. 31, 2023

(65) Prior Publication Data
US 2025/0132786 A1 Apr. 24, 2025

(30) Foreign Application Priority Data
Feb. 24, 2022 (CN) .......................... 202210177126.0

(51) Int. Cl.
*H04B 7/04* (2017.01)
*H04L 25/02* (2006.01)
(52) U.S. Cl.
CPC ..... *H04B 7/04013* (2023.05); *H04L 25/0228* (2013.01); *H04L 25/0242* (2013.01)

(58) Field of Classification Search
CPC ................................................... H04B 7/04013
(Continued)

(56) References Cited

U.S. PATENT DOCUMENTS 6,633,762 B1* 10/2003 Rauscher .............. H04W 36/34
455/437
2012/0182318 A1* 7/2012 Mansfield ................. G06T 3/00
345/643
(Continued)

FOREIGN PATENT DOCUMENTS

CN 109301490 A 2/2019
CN 112803975 A 5/2021
(Continued)

OTHER PUBLICATIONS

International Search Report and Written Opinion mailed on Jun. 5, 2023, received for PCT Application PCT/CN2023/076697, filed on Feb. 17, 2023, 08 pages including English Translation.

*Primary Examiner* — Lihong Yu
(74) *Attorney, Agent, or Firm* — XSENSUS LLP

(57) ABSTRACT

The present disclosure provides an electronic device and method for wireless communication, and a computer readable storage medium. The electronic device comprises: a processing circuit, configured to estimate a first channel between a network node and an intelligent reflecting surface; pre-code, at least based on the estimated first channel, a plane wave signal sent by the network node, so that a channel model between the network node and a network terminal is equivalent to an orbital angular momentum channel model between the intelligent reflecting surface and the network terminal; and send the pre-coded plane wave signal.

18 Claims, 15 Drawing Sheets

(58) Field of Classification Search
USPC ........................................................ 375/262
See application file for complete search history.

(56) References Cited

U.S. PATENT DOCUMENTS

| | | | | |
|---|---|---|---|---|
| 2018/0006796 A1* | 1/2018 | Hui | ................... | H04B 7/15557 |
| 2021/0399766 A1 | 12/2021 | Zenkyu et al. | | |
| 2022/0014935 A1* | 1/2022 | Haija | ................... | H04L 5/0048 |
| 2024/0388328 A1* | 11/2024 | Elshafie | .............. | H04B 7/0639 |
| 2025/0047445 A1* | 2/2025 | Huang | ................ | H04B 7/0478 |

FOREIGN PATENT DOCUMENTS

| | | |
|---|---|---|
| CN | 112868188 A | 5/2021 |
| CN | 113133014 A | 7/2021 |
| CN | 113765550 A | 12/2021 |

* cited by examiner

ELECTRONIC DEVICE AND METHOD FOR WIRELESS COMMUNICATION, AND COMPUTER READABLE STORAGE MEDIUM

CROSS-REFERENCE TO RELATED APPLICATIONS

The present application is based on PCT filing PCT/CN2023/076697, filed on Feb. 17, 2023, which claims priority to Chinese Patent Application No. 202210177126.0, titled "ELECTRONIC DEVICE AND METHOD FOR WIRELESS COMMUNICATION, AND COMPUTER READABLE STORAGE MEDIUM", filed on Feb. 24, 2022 with the China National Intellectual Property Administration, each are incorporated herein by reference in its entirety.

FIELD

The present disclosure relates to the technical field of wireless communications, and in particular to orbital angular momentum (OAM) communication technology using a large intelligent reflecting surface (LIS). More particularly, the present disclosure relates to an electronic apparatus and a method for wireless communications, and a computer-readable storage medium.

BACKGROUND

Electromagnetic waves have both linear momentum and angular momentum. The angular momentum may be decomposed into a spin angular momentum (SAM) and an orbital angular momentum (OAM). The OAM is a result of a change of a phase of a wave relative to an azimuth $\theta$ around a propagation axis of the wave. The change results in a spiral phase distribution ($\Phi=l*\theta$), where l represents the number of OAM modes and refers to the number of complete phase rotations within one wavelength.

Due to orthogonality between OAM modes with different integer mode numbers, mode division multiplexing (MDM) making use of OAM is considered to be applicable to future wireless communications. As an additional degree of freedom, the improvement of spectral efficiency brought by OAM and the potential of OAM in communications attract extensive attentions.

The LIS is a completely new revolutionary technology. A large number of low-cost passive reflective components are integrated on a plane to intelligently reconfigure a wireless propagation environment, so as to significantly improve the performance of a wireless communication network.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

According to an aspect of the present disclosure, an electronic apparatus for wireless communications is provided. The electronic apparatus includes processing circuitry. The processing circuitry is configured to: estimate a first channel between a network node and an intelligent reflecting surface; pre-code a plane wave signal transmitted by the network node at least based on the estimated first channel, to cause a channel model between the network node and a network terminal to be equivalent to an orbital angular momentum channel model between the intelligent reflecting surface and the network terminal; and transmit the pre-coded plane wave signal.

According to another aspect of the present disclosure, a method for wireless communications is provided. The method includes: estimating a first channel between a network node and an intelligent reflecting surface; pre-coding a plane wave signal transmitted by the network node at least based on the estimated first channel, to cause a channel model between the network node and a network terminal to be equivalent to an orbital angular momentum channel model between the intelligent reflecting surface and the network terminal; and transmitting the pre-coded plane wave signal.

With the electronic apparatus and the method according to the above aspects of the present disclosure, the plane wave signal is pre-coded based on the estimation of the first channel, which enables to realize the OAM communication between the network terminal supporting OAM communication and the network node not provided with the OAM antenna by means of the LIS.

According to other aspects of the present disclosure, there are further provided computer program codes and computer program products for implementing the methods for wireless communications above, and a computer-readable storage medium having recorded thereon the computer program codes for implementing the methods for wireless communications described above.

These and other advantages of the present disclosure will be more apparent from the following detailed description of preferred embodiments of the present disclosure in conjunction with the accompanying drawings.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings.

DETAILED DESCRIPTION OF EMBODIMENTS

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a service, and these constraints may change as the embodiments differs. Furthermore, it should also be understood that although the development work may be very complicated and timeconsuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

Figure 1:
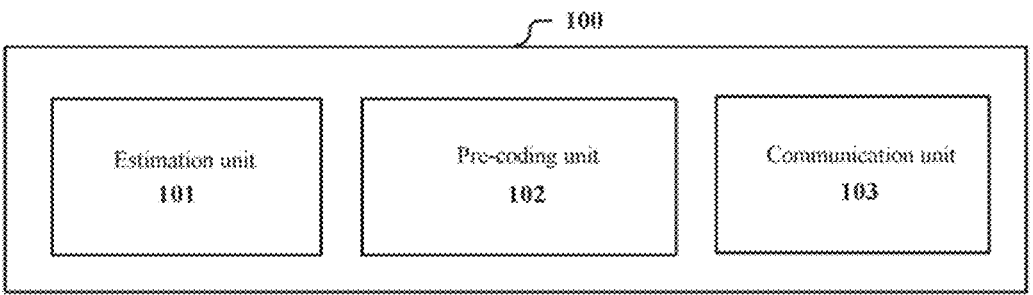
FIG. 1 is a block diagram illustrating functional modules of an electronic apparatus for wireless communications according to an embodiment of the present disclosure.

FIG. 1 is a block diagram illustrating functional modules of an electronic apparatus 100 for wireless communications according to an embodiment of the present disclosure. As illustrated in FIG. 1, the electronic apparatus 100 includes an estimation unit 101, a pre-coding unit 102 and a communication unit 103. The estimation unit 101 is configured to estimate a first channel between a network node and an LIS. The pre-coding unit 102 is configured to pre-code a plane wave signal transmitted by the network node at least based on the estimated first channel, to cause a channel model between the network node and a network terminal to be equivalent to an OAM channel model between the LIS and the network terminal. The communication unit 103 is configured to transmit the pre-coded plane wave signal.

The estimation unit 101, the pre-coding unit 102, and the communication unit 103 may be implemented by one or more processing circuitries. The processing circuitry may be implemented as, for example, a chip. In addition, it should be understood that various functional units in the apparatus illustrated in FIG. 1 are only logical modules divided based on specific functions implemented by these functional units, and are not intended to limit the specific implementations.

For example, the electronic apparatus 100 may be arranged at a network node side, or communicatively connected to a network node. The network node here may refer to an apparatus that can help a terminal apparatus access a wireless communication network, for example, a transmit and receive point (TRP), and the like. Here it should be further noted that the electronic apparatus 100 may be implemented at a chip level or be implemented at a device level. For example, the electronic apparatus 100 may function as the network node itself and further include external apparatuses such as a memory and a transceiver (not illustrated in the drawings). The memory may be configured to store programs required for the network node to implement various functions and related data information. The transceiver may include one or more communication interfaces to support communications with different apparatuses (for example, another network node, UE or the like). Implementations of the transceiver are not limited herein.

In addition, the network terminal refers to a terminal apparatus configured to implement a network communication function, for example, user equipment (UE) and the like. The user equipment may be implemented as a mobile terminal (such as a smart phone, a tablet personal computer (PC), a notebook PC, a portable game terminal, a portable/dongle type mobile router, and a digital camera), or an on-vehicle terminal (such as a car navigation device). The user equipment may also be implemented as a terminal (that is also referred to as a machine type communication (MTC) terminal) that performs machine-to-machine (M2M) communication. Furthermore, the user equipment may be a radio communication module (such as an integrated circuit module including a single chip) mounted on each of the terminals. When a network terminal supporting OAM communication (hereinafter also referred to as an OAM user) moves to a coverage range of a network node (for example, a base station) provided with no OAM antenna, a data transmission rate drops sharply because only a plane wave mode can be applied in this case. In this embodiment, a plane wave is proposed to be converted into a vortex wave by means of an LIS to cause the network node provided with no OAM antenna to be capable of supporting OAM communication of the OAM user.

Specifically, according to this embodiment, the estimation unit 101 first estimates the channel between the network node and the intelligent reflecting surface (referred to as the first channel herein for differentiation), and the pre-coding unit 102 pre-codes the plane wave signal transmitted by the network node based on the estimated first channel. For example, the pre-coding is implemented by using a pre-coding matrix. The pre-coding matrix is set based on the estimated first channel, and causes the channel model between the network node and the network terminal to be equivalent to the OAM channel model between the LIS and the network terminal. The communication unit 103 transmits the pre-coded plane wave signal. The pre-coded plane wave signal is reflected by the LIS and then reaches the network terminal in a form of a vortex wave.

It should be noted that in communication assisted by means of the LIS, there may be two scenarios, namely a scenario in which there is no light of sight between the network node and the network terminal and a scenario in which there is a light of sight between the network node and the network terminal. The two scenarios are different in setting the pre-coding matrix. Therefore, how to set the pre-coding matrix is described below for the two scenarios respectively. In the following description, it is assumed that the estimation unit 101 has estimated the first channel. It should be understood that various channel estimation ways are applicable, which is not restrictive. In addition, three ways of estimating the first channel provided in the present disclosure will be described in detail in a second embodiment.

Figure 2:
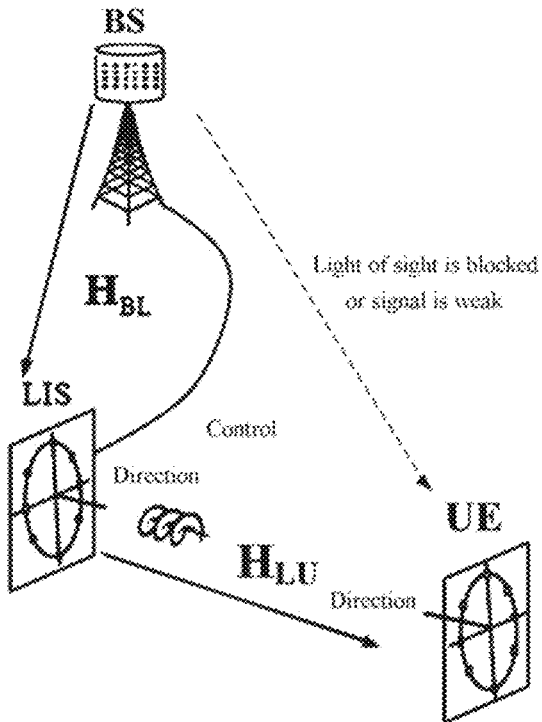
FIG. 2 is a schematic diagram of a system for realizing OAM communication by means of an LIS in a case of there being no light of sight.

In a first example, there is no light of sight between the network node and the network terminal. That is, a light of sight between the network node and the network terminal is blocked or a signal reaching the network terminal through the light of sight is very weak. FIG. 2 is a schematic diagram of a system for realizing OAM communication by means of an LIS in this case. The network node is illustrated as a BS, and the network terminal is illustrated as an OAM UE. The BS controls the LIS through a wired or wireless control link. It is assumed that the BS is provided with M antennas and the OAM UE and the LIS each are provided with N antennas.

Figure 3:
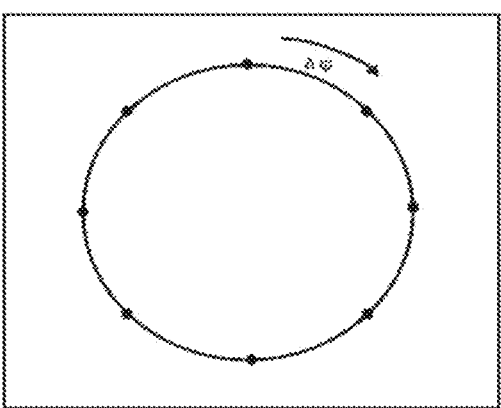
FIG. 3 illustrates an array structure of the LIS as an example.

Reflection units of the LIS are configured as a uniform circular array (UCA) to convert a received plane wave into a vortex wave. A phase difference between the units is expressed as $\Delta\phi=2\pi/N$, where N represents the number of units in the array, and 1 represents an OAM modal. FIG. 3 illustrates an array structure of the LIS in a case of N=8 as an example. It should be understood that the present disclosure is not limited thereto.

A complete downlink channel model of the system illustrated in FIG. 2 can be expressed as the following equation (1):

$$Y = GH_{LU}\Phi H_{BL}WS + V \qquad (1)$$

In equation (1), Y represents a receiving signal vector of a dimension N*1, G represents a receiving matrix of a dimension N*N, W represents a pre-coding matrix of a dimension M*N, and V represents an additive white Gaussian noise (AWGN) signal of a dimension N*1. X represents a transmission signal vector of a dimension N*1, and elements in X are, for example, symbols subjected to modulation of a constellation diagram such as QPSK or QAM. $H_{LU}$ represents a channel matrix between the LIS and the UE, and is expressed as:

$$H_{LU} = \begin{bmatrix} h_{LU}(0, 0) & h_{LU}(0, 1) & ... & h_{LU}(0, N-1) \\ h_{LU}(1, 0) & h_{LU}(1, 1) & ... & h_{LU}(1, N-1) \\ ... & ... & ... & ... \\ h_{LU}(N-1, 0) & h_{LU}(N-1, 1) & ... & h_{LU}(N-1, N-1) \end{bmatrix} \qquad (2)$$

In equation (2), $h_{LU}$ (i, j) represents a channel between an i-th antenna of the OAM UE and a j-th reflection unit of the LIS. $H_{BL}$ represents a channel matrix between the BS and the LIS, namely a channel matrix of the first channel, and is expressed as:

$$H_{BL} = \begin{bmatrix} h_{BL}(0, 0) & h_{BL}(0, 1) & ... & h_{BL}(0, M-1) \\ h_{BL}(1, 0) & h_{BL}(1, 1) & ... & h_{BL}(1, M-1) \\ ... & ... & ... & ... \\ h_{BL}(N-1, 0) & h_{BL}(N-1, 1) & ... & h_{BL}(N-1, M-1) \end{bmatrix} \qquad (3)$$

In equation (3), $h_{BL}$ (n,m) represents a channel between an n-th unit of the LIS and an m-th antenna of the BS. $\Phi$ represents a matrix composed of adjustment coefficients of the N reflection units of the LIS and is expressed as:

$$\Phi = \begin{bmatrix} \alpha_0 & & 0 \\ & \alpha_1 & \\ & & O \\ 0 & & \alpha_{N-1} \end{bmatrix} \qquad (4)$$

In equation (4), $\alpha_n$ represents an adjustment coefficient of the n-th reflection unit. With the channel model, the pre-coding matrix is set according to the following equation (5):

$$W = H_{BL}^H \left( H_{BL} H_{BL}^H \right)^{-1} F^H \qquad (5)$$

In equation (5), F represents a discrete Fourier transform (DFT) matrix of a dimension N*N, and $(\cdot)^H$ represents a conjugate transpose operation. Here, in order to simplify an analysis of the channel, the reflection coefficient matrix $\Phi$ of the LIS may be set as an identity matrix and it is set that the receiving matrix G=F. In a case that $H_{BL}$ is known, the pre-coding matrix can be obtained. The above settings are substituted into the original channel model expressed as equation (1) to obtain a model of a conventional OAM channel, which is expressed as the following equation (6):

$$Y = FH_{LU}F^H S \qquad (6)$$

In this case, the OAM UE can normally communicate with the BS using the vortex wave.

At the receiving end, assuming that the LIS and the OAM UE are coaxial and parallel, then $H_{LU}$ is a circulant matrix, in which elements in respective rows are in a form of a circular shift. In this case, equation (6) is decomposed to obtain the following equation:

$$Y = \begin{bmatrix} h_0 & & & 0 \\ & h_1 & & \\ & & O & \\ 0 & & & h_{N-1} \end{bmatrix} S \tag{7}$$

In equation (7), $h_n$ represents an effective channel parameter. As can be seen from equation (7), compared with the conventional plane wave MIMO system, a channel can be decomposed into orthogonal independent data streams in the OAM communication without a complex operation such as matrix inversion.

In order to determine the effective channel parameter, the pre-coding unit 102 pre-codes a pilot signal at least based on the estimated first channel, and the communication unit 103 transmits the pre-coded pilot signal to the network terminal. In this way, the network terminal determines the effective channel parameter between the LIS and the network terminal based on reception of the pre-coded pilot signal, and performs data demodulation based on the effective channel parameter.

It should be noted that once the LIS is installed, a position of the LIS is fixed and the channel $H_{BL}$ between the LIS and the BS changes very slowly. A position of the OAM user changes randomly, so that the channel $H_{LU}$ between the OAM user and the LIS changes rapidly. That is, the effective channel parameter changes rapidly. Therefore, the effective channel parameter should be updated at a higher rate, and a rate of updating $H_{BL}$ can be much lower than a rate of updating $H_{LU}$. $H_{BL}$ may be measured and updated after dozens or even hundreds of symbols, and a specific updating rate may be set by the system.

Figure 4:
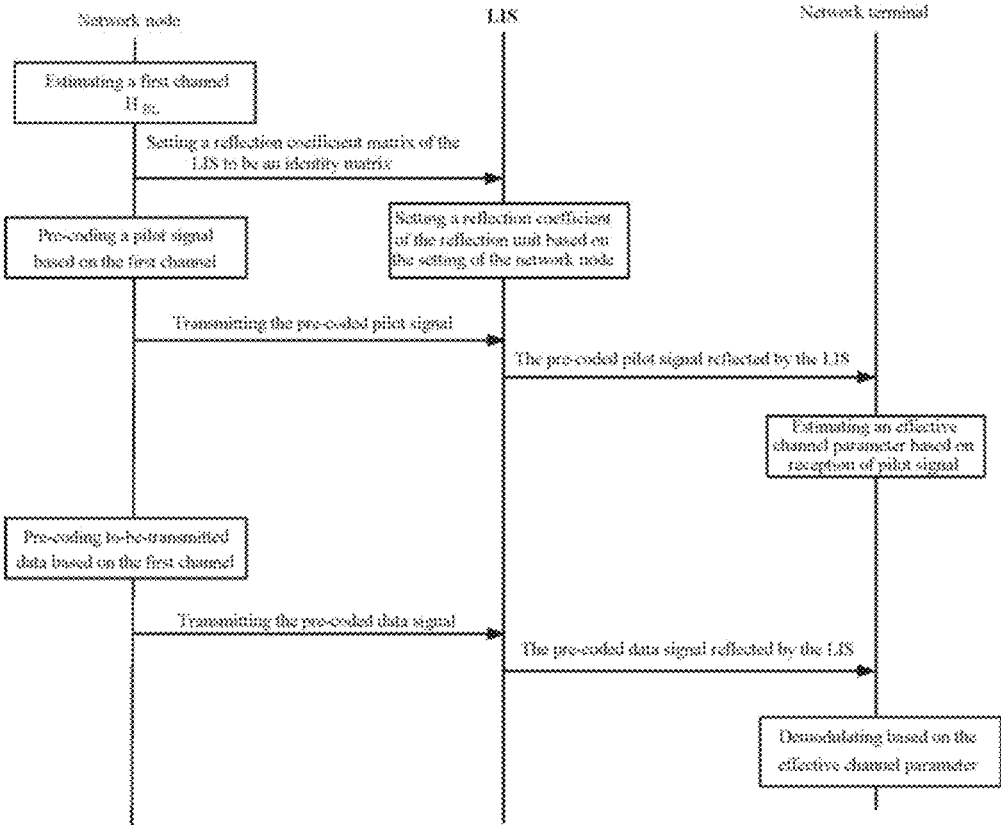
FIG. 4 is a schematic diagram illustrating an example of a relevant operation flow among a network node, the LIS and a network terminal.

In order to facilitating understanding, FIG. 4 illustrates a schematic diagram of an example of a relevant workflow among a network node (for example, a BS), an LIS and a network terminal (for example, UE).

First, the network node estimates a first channel between the network node and the LIS, for example, to obtain a pre-coding matrix. The network node further sets a reflection coefficient matrix of the LIS through a wired or wireless control link. For example, the reflection coefficient matrix is set to an identity matrix. That is, reflection coefficients of all reflection units of the LIS are set to 1. Next, the network node pre-codes the pilot signal based on the estimated first channel. For example, the pilot signal is pre-coded using the pre-coding matrix. The pilot signal is known to the network terminal. The network node transmits the pre-coded pilot signal to the LIS, and the LIS reflects the pre-coded pilot signal to the network terminal. Since the network terminal knows the pilot signal, the network terminal can estimate the effective channel parameter based on the received pilot signal according to equation (7). Next, the workflow enters a data transmission phase. The network node pre-codes the to-be-transmitted data based on the estimated first channel (for example, using the pre-coding matrix) and transmits the pre-coded to-be-transmitted data to the LIS, which reflects it to the network terminal. In addition, the network terminal can demodulate the received data based on the previously estimated effective channel parameter according to equation (7) to obtain the to-be-transmitted data transmitted by the network node.

Figure 5:
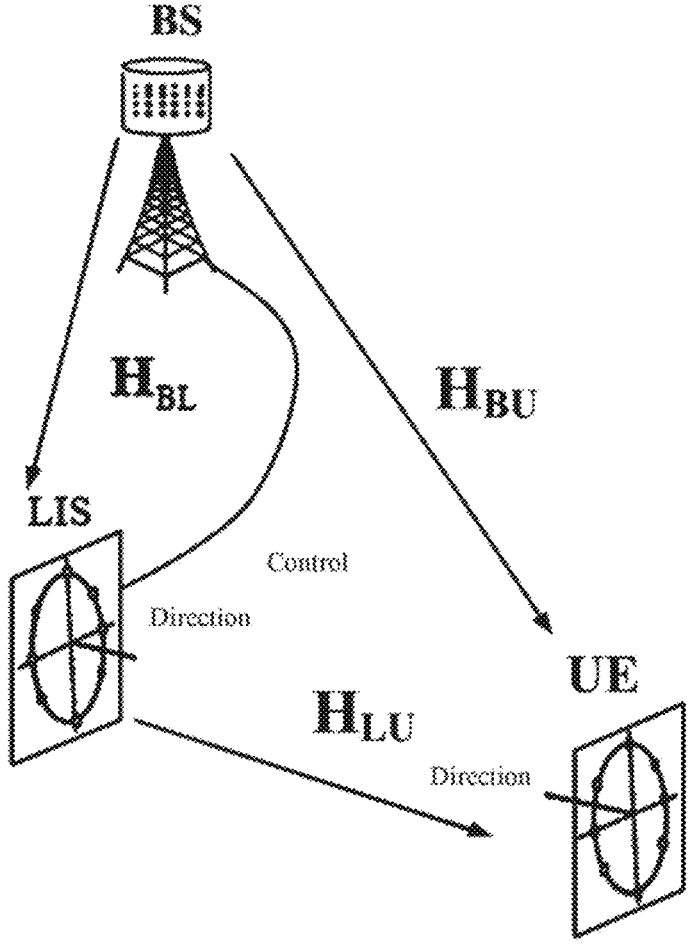
FIG. 5 is a schematic diagram of a system for realizing OAM communication by means of the LIS in a case of there being the light of sight.

As a second example, there is a light of sight between the network node and the network terminal. That is, a signal transmitted by the network node can be reflected to the network terminal by the LIS or directly transmitted to the network terminal. FIG. 5 is a schematic diagram of a system for realizing OAM communication by means of the LIS in this case. Similarly, it is assumed that the BS is provided with M antennas, the OAM UE and the LIS each are provided with N antennas, and the reflection units of the LIS are configured as a uniform circular array.

A complete downlink channel model of the system illustrated in FIG. 5 may be expressed as:

$$Y = G(H_{LU}\Phi H_{BL} + H_{BU})WS + V \tag{8}$$

In equation (8), $H_{BU}$ represents a direct-channel matrix between the BS and the UE, and is expressed as:

$$H_{BU} = \begin{bmatrix} h_{BU}(0,0) & h_{BU}(0,1) & \dots & h_{BU}(0,M-1) \\ h_{BU}(1,0) & h_{BU}(1,1) & \dots & h_{BU}(1,M-1) \\ \dots & \dots & \dots & \dots \\ h_{BU}(N-1,0) & h_{LU}(N-1,1) & \dots & h_{BU}(N-1,M-1) \end{bmatrix} \tag{9}$$

In equation (9), $h_{BU}$ (n, m) represents a channel between an n-th antenna of the OAM UE and an m-th antenna of the BS. Meanings of other parameters are the same as the meanings in equation (1), and the meanings are not repeated here.

Due to existence of $H_{BU}$, the plane wave signal of the BS interferes with the OAM signal obtained through conversion of the LIS, and therefore it is required to remove the interference. For example, the estimation unit 101 can be further configured to estimate a light of sight channel between the network node and the network terminal. The pre-coding unit 102 performs pre-coding further based on the estimated light of sight channel in addition to the estimated first channel, to eliminate the influence of the plane wave signal transmitted through the light of sight. Therefore, the pre-coding matrix in this example is different from the pre-coding matrix in the first example.

For example, the pre-coding unit 102 is configured to perform pre-coding using a dirty paper algorithm or a block diagonalization (BD) algorithm. Since the number of antennas of the BS is usually much greater than the number of antennas of the UE, the multi-user interference removal method in the conventional MIMO system may be used for reference. Here, it takes a common BD algorithm as an example. The pre-coding may include first pre-coding and second pre-coding. The first pre-coding is used to eliminate the influence of the plane wave transmitted through the light of sight. For example, a pre-coding matrix for the first pre-coding may be a Null space of a channel matrix of the estimated light of sight channel.

Specifically, the pre-coding matrix mat be set as:

$$W = W_1 W_2 \tag{10}$$

In equation (10), $W_1$ represents a pre-coding matrix for the first pre-coding. Supposing M>2N and the matrix $W_1$ is a Null space of $H_{BU}$, that is:

$$H_{BU}W_1 = 0 \tag{11}$$

After $W_1$ is solved, $W_2$ may be set as:

$$W_2 = (H_{BL}W_1)^H (H_{BL}W_1 W_1^H H_{BL}^H)^{-1} F^H \tag{12}$$

Similarly, F represents a DFT matrix, $\Phi$ represents an identity matrix, and the receiving matrix G=F. The above settings are substituted into the original channel model expressed as equation (8) to obtain a model of the conventional OAM channel, which is expressed as the following equation (13):

$$Y = FH_{LU}F^H S \tag{13}$$

In this case, the OAM UE can normally communicate with the BS using the vortex wave.

At the receiving end, still assuming that the LIS and the OAM UE are coaxial and parallel, $H_{LU}$ is a circulant matrix, in which elements in respective rows are in a form of circular shift. In this case, equation (13) can also be decomposed to obtain the above equation (7).

In order to determine the effective channel parameter, the pre-coding unit 102 may pre-code the pilot signal based on the estimated first channel and the estimated light of sight channel, and the communication unit 103 transmits the pre-coded pilot signal to the network terminal. In this way, the network terminal determines the effective channel parameter between the LIS and the network terminal based on the reception of the pre-coded pilot signal, and performs data demodulation based on the effective channel parameter.

Similarly, the effective channel parameter is updated at a higher rate. A rate of updating $H_{BL}$ is much lower than a rate of updating $H_{LU}$. $H_{BL}$ may be measured and updated after dozens or even hundreds of symbols. A specific updating rate may be set by the system.

Figure 6:
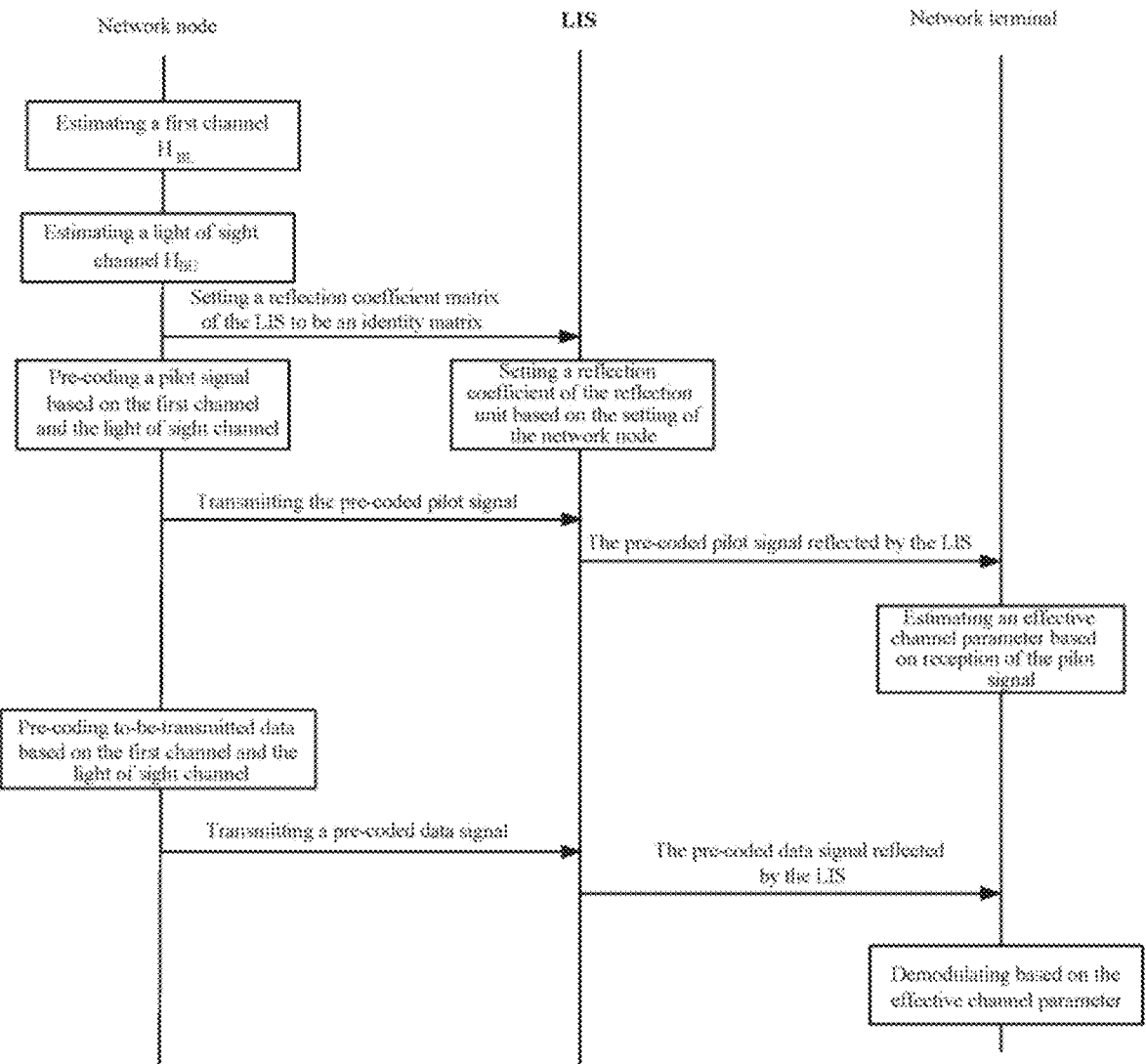
FIG. 6 is a schematic diagram illustrating an example of a relevant operation flow among a network node, the LIS and a network terminal.

In order to facilitate understanding, FIG. 6 illustrates a schematic diagram of an example of a relevant workflow among the network node (for example, the BS), the LIS and the network terminal (for example, the UE).

First, the network node estimates the first channel between the network node and the LIS. In addition, the network node estimates the light of sight channel between the network node and the network terminal. It should be noted that a chronological order in which the first channel and the light of sight channel are estimated is not limited, and an order illustrated in FIG. 6 does not represent an actual chronological order. In addition, since the position of the network terminal changes randomly, the light of sight channel between the network node and the network terminal changes rapidly, and the updating rate of the $H_{BU}$ can be set higher.

Subsequent processes are similar to the processes illustrated in FIG. 4. Specifically, the network node sets the reflection coefficient matrix of the LIS through a wired or wireless control link. For example, the reflection coefficient matrix is set to an identity matrix. The network node pre-codes the pilot signal based on the first channel estimation and the light of sight channel estimation. For example, the network node pre-codes the pilot signal using the pre-coding matrix expressed as equation (10). The pilot signal is known to the network terminal. The network node transmits the pre-coded pilot signal to the LIS, and the LIS reflects the pre-coded pilot signal to the network terminal. Since the network terminal knows the pilot signal, the network terminal can estimate the effective channel parameter based on the received pilot signal according to equation (7). Next, the workflow enters a data transmission phase. The network node pre-codes to-be-transmitted data based on the estimated first channel and the estimated light of sight channel and transmits the pre-coded to-be-transmitted data to the LIS. The LIS reflects the pre-coded to-be-transmitted data to the network terminal. In addition, the network terminal demodulates the received data based on the previously estimated effective channel parameter according to equation (7), to obtain the to-be-transmitted data transmitted by the network node.

The light of sight channel may be estimated as follows. For example, the communication unit 103 can be configured to turn off all reflection units of the LIS; transmit pilot signals successively to the network terminal using respective antennas of the network node, the network terminal measuring the pilot signals and estimating the light of sight channel based on a measurement result; and obtain the estimated light of sight channel from the network terminal.

All the reflection units of the LIS are turned off in order to eliminate the interference of the signal reflected by the LIS to the direct signal. Taking the case illustrated in FIG. 5 as an example, when the network node transmits a pilot signal using an m-th ($0 \leq m \leq M-1$) antenna (other antennas do not transmit signals), the UE may obtain channels between the m-th antenna of the network node and respective antennas of the UE, namely an m-th column of $H_{BU}$ in equation (9), based on the received pilot signal. After the network node successively selects M antennas to transmit the pilot signals, the network terminal obtains a complete $H_{BU}$ and feeds back the complete $H_{BU}$ to the network node.

It should be noted that in a case that the system operates in a time division duplex (TDD) mode, $H_{BU}$ may be estimated through uplink transmission due to reciprocity between an uplink channel and a downlink channel. A workflow in this mode is similar to the workflow described above. That is, the network terminal successively transmits pilot signals to the network node using respective antennas, and the network node measures the pilot signals and obtains the light of sight channel based on a measurement result. Specifically, taking the case illustrated in FIG. 5 as an example, when the network terminal (the UE) transmits a pilot signal using an n-th ($0 \leq n \leq N-1$) antenna (other antennas do not transmit signals), the network node may obtain channels between the n-th antenna of the network terminal and respective antennas of the network node, namely an n-th row of $H_{BU}$ in equation (9), based on the received pilot signal. After the network terminal successively transmits the pilot signals using N antennas, the network node obtains the complete $H_{BU}$. At this time, a signal transmitted by a single antenna of the network terminal is a plane wave, and the network terminal does not need to feed back the channel parameter.

In summary, the electronic apparatus 100 according to the embodiment pre-codes the plane wave signal, which enables to realize the OAM communication between the network terminal supporting OAM communication and the network node not provided with the OAM antenna by means of the LIS. In addition, the electronic apparatus 100 is applicable regardless whether there is a light of sight or not.

Second Embodiment

Three examples of estimating the first channel by the estimation unit 101 described in the first embodiment are provided in this embodiment. It should be understood that the examples are not restrictive.

First Example

In this example, the estimation unit 101 is configured to estimate the first channel using a dump access point (dump AP). The dump access point is arranged within a range not exceeding a predetermined distance from the LIS.

Figure 7:
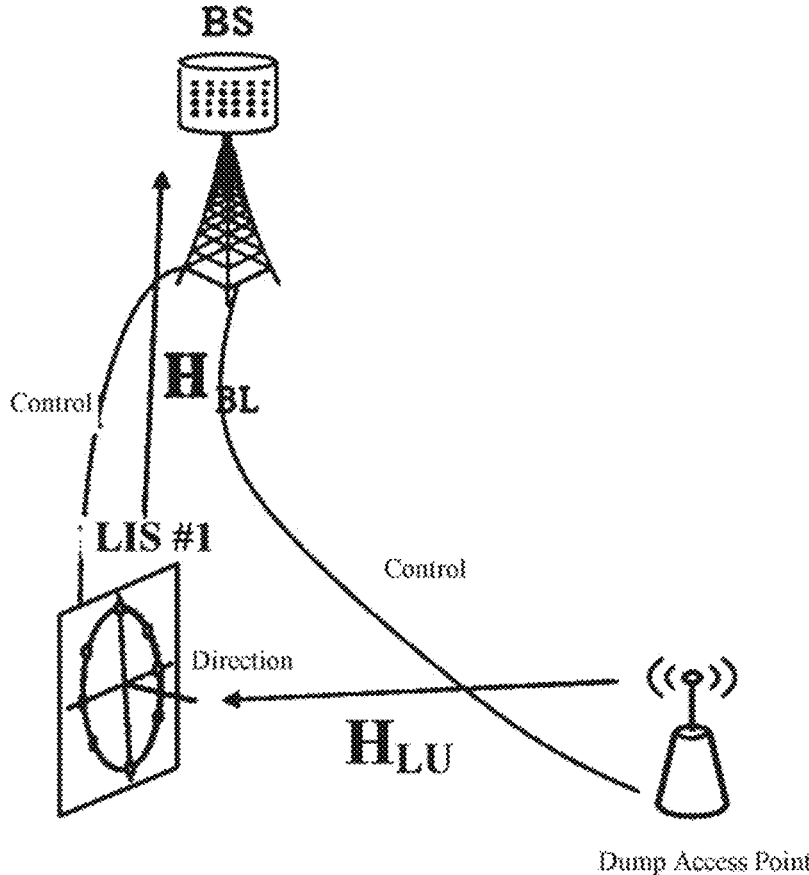
FIG. 7 is a schematic diagram of a system for estimating of a first channel using a dump access point.

FIG. 7 illustrates a schematic diagram of a system for estimating of the first channel using a dump access point. The dump access point is connected to the network node through a wired or wireless link, and the dump access point has a radio frequency link for generating a wireless signal. The dump access point is controlled by the network node to transmit signals periodically, so as to estimate the channel. The dump access point is arranged at a position close enough to the LIS, so that a parameter of the dump access point can be obtained based on the position of the LIS. In addition, one single dump access point may be deployed for multiple LISs.

Figure 8:
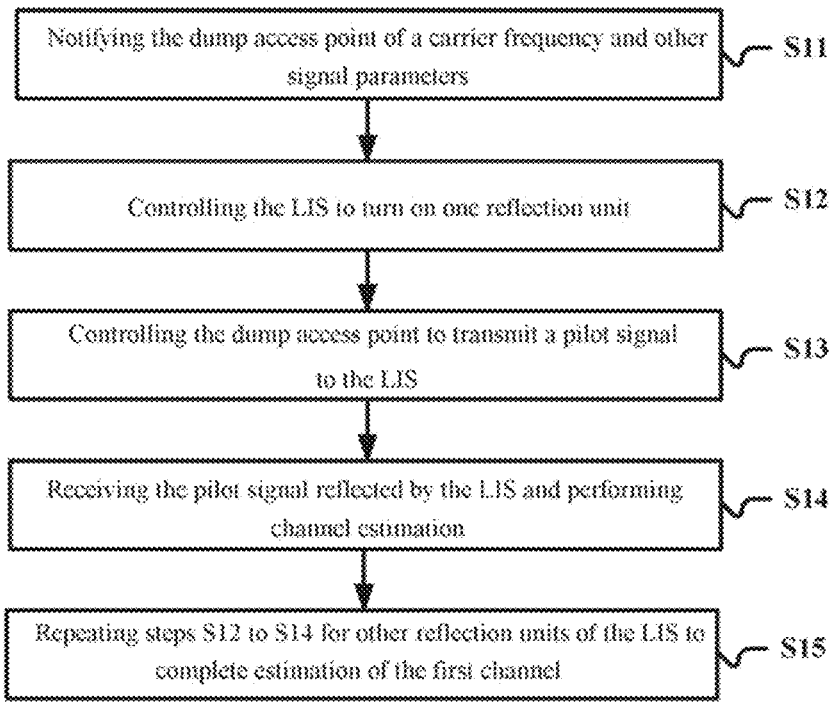
FIG. 8 is a flowchart of estimating of the first channel using the dump access point.

The steps of estimating the first channel using the dump access point can be made reference to, for example, FIG. 8, which is described specifically as follows. First, in step S11, the network node notifies the dump access point of a carrier frequency and other signal parameters, so that the dump access point can transmit signals as required. During the estimation, the network node (for example, the estimation unit 101) controls the LIS to turn on one reflection unit and turn off remaining reflection units (S12), and then controls the dump access point to transmit a pilot signal to the LIS (S13). The communication unit 103 receives the pilot signal reflected by the LIS and performs channel estimation to obtain, for example, a first row of $H_{BL}$ expressed in equation (3) (S14). The network node performs the above steps S12 to S14 for each reflection unit of the LIS. That is, other reflection units of the LIS are turned on successively and the dump access point is controlled to transmit a pilot signal. The communication unit 103 receives the pilot signal reflected by the LIS and performs channel estimation to obtain other rows of $H_{BL}$, so as to complete estimation of $H_{BL}$ (S15).

Second Example

In this example, the estimation unit 101 is configured to estimate the first channel based on virtual full duplex measurement.

In the virtual full duplex measurement, the network node transmits a signal and receives the signal itself. That is, the network node transmits a pilot signal, and the pilot signal is reflected by the LIS and other surrounding objects and then is received by the network node. In a case that the pilot signal is transmitted and received using different antennas respectively, virtual full duplex transmission is realized. In this case, the first channel is estimated by estimating a dual-link cascaded channel from the network node to the LIS and then to the network node.

Figure 9:
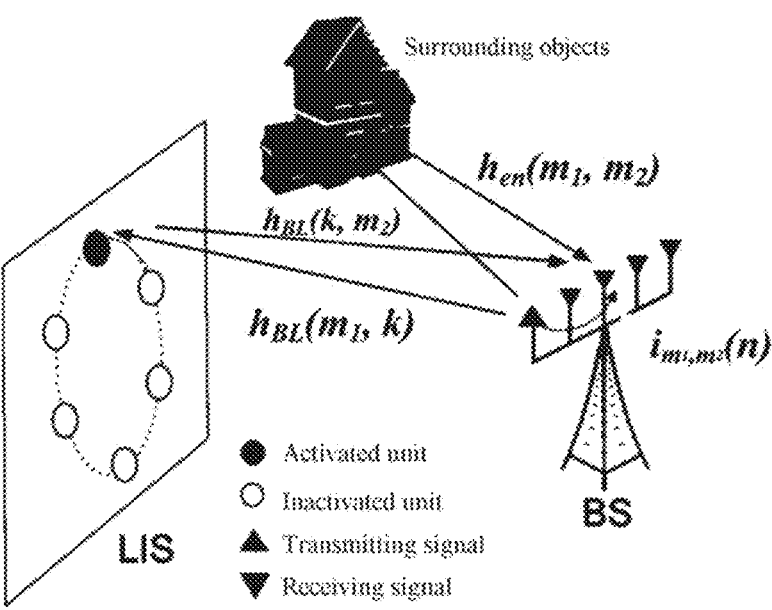
FIG. 9 is a schematic diagram of a system for estimating of the first channel based on virtual full duplex measurement.

FIG. 9 is a schematic diagram of a system for estimating of the first channel based on the virtual full duplex measurement. In FIG. 9, the network node is illustrated as a base station BS. Assuming that the BS controls the LIS to activate a k-th reflection unit and an antenna m1 of the BS transmits a signal. The signal is reflected by the LIS and surrounding objects, then reaches other antenna (an antenna m2 is taken as example here and m2 is different from m1) of the BS, and superimposed with a self-interference signal at a time instant n. A model of the system is expressed as:

$$y_{m_1,m_2}(n) = [h_{BL}(k, m_2)\phi(k)h_{BL}(m_1, k) + h_{en}(m_1, m_2)]x_{m_1}(n) + \quad (14)$$
$$i_{m_1,m_2}(n) + w_{m_1,m_2}(n)$$

In equation (14), $x_{m_1}(n)$ represents the signal transmitted by the antenna m1, $y_{m_1,m_2}(n)$ represents the signal received by the antenna m2, $h_{BL}(k,m_2)$ represents a channel between the k-th reflection unit of the LIS and the antenna m2 of the BS, $h_{BL}(m_1, k)$ represents a channel between the antenna m1 of the BS and the k-th reflection unit of the LIS, $\phi(k)$ represents an adjustment coefficient of the k-th reflection unit of the LIS, $i_{m_1,m_2}(n)$ represents self-interference between antennas of the BS, $w_{m_1,m_2}(n)$ represents a noise, and $h_{en}(m_1, m_2)$ represents ambient reflection.

The self-interference is generated because the signal may be directly transmitted from the antenna m1 to the antenna m2 when the BS operates in the full duplex mode. Before the self-interference is eliminated, the self-interference may even be greater than the required signal in a full duplex system. However, methods for suppressing the self-interference have been widely studied. Therefore, in the following analysis, it is assumed that the self-interference is included in the noise and is not considered separately.

$h_{en}(m_1, m_2)$ is used to represent the ambient reflection considering that the signal transmitted by the antenna m1 is reflected to the antenna m2 by some surrounding objects in addition to the reflection units of the LIS. Therefore, it is required to estimate the ambient reflection in advance.

Figure 10:
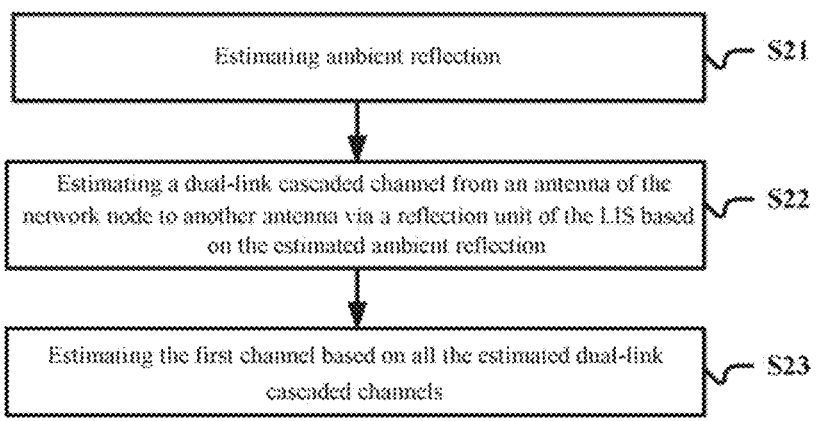
FIG. 10 is a flowchart of estimating of the first channel based on virtual full duplex measurement.

FIG. 10 is a flowchart of estimating of the first channel. In step S21, all units of the LIS are turned off, and a pilot signal is transmitted using a first antenna of the network node and received using other antennas of the network node, to estimate the ambient reflection. In step S22, for each antenna of the network node, respective reflection units of the LIS are successively turned on, a pilot signal is transmitted using the antenna of the network node and received using other antennas of the network node, to estimate dual-link cascaded channels from the antenna to other antennas via the reflection unit of the LIS based on the estimated ambient reflection. In step S23, the first channel is estimated based on all the estimated dual-link cascaded channels.

Figure 11:
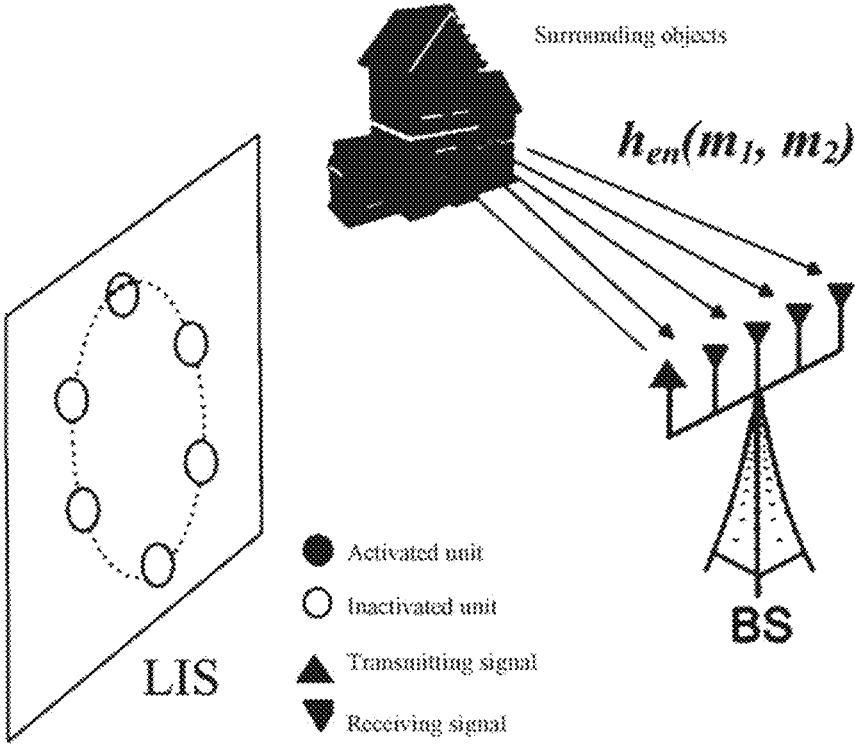
FIG. 11 is a schematic diagram of a system for estimating of the first channel based on virtual full duplex measurement.

Specifically, in step S21, for example, at a time instant n, all reflection units in the LIS are set to be in an inactive state and no signal is reflected. The antenna m1 of the BS transmits a pilot signal. The pilot signal is reflected by surrounding objects and then is received by other antennas of the BS, to be used for estimating the ambient reflection. A schematic diagram of the system is illustrated in FIG. 11. Here the antenna m1 serves as an example of the first antenna, and the present disclosure is not limited thereto.

A model of the system is expressed as:

$$y_{m_1,m_2}(n) = h_{en}(m_1, m_2)x_{m_1}(n) + w_{m_1,m_2}(n) \quad (15)$$

Meanings of symbols in equation (15) are the same as the meanings of these symbols in equation (14), and the meanings of the symbols are not repeated here. The ambient reflection estimated according to equation (15) is expressed as:

$$\tilde{h}_{en}(m_1, m_2) = \frac{y_{m_1, m_2}(n)}{x_{m_1}(n)} \qquad (16)$$

Figure 12:
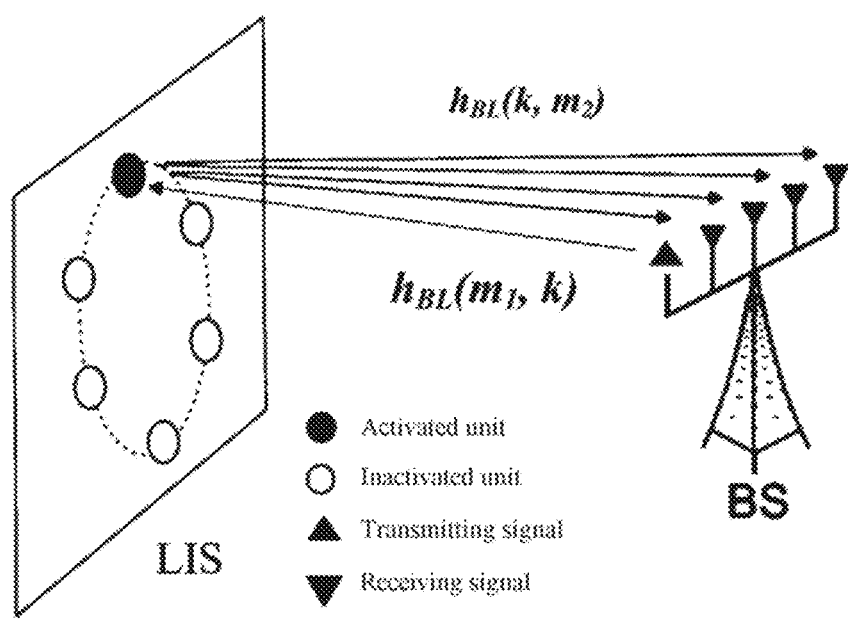
FIG. 12 is a schematic diagram of a system for estimating of the first channel based on virtual full duplex measurement.

Next, in step S21, for example, at a time instant (n+1), the BS controls the LIS to activate a k-th reflection unit and remaining reflection units remain turned off (not activated). The antenna m1 of the BS transmits a pilot signal. The pilot signal is reflected by the LIS and then is received by other antennas of the BS, to estimate dual-link cascaded channels from the antenna m1 to the k-th reflection unit of the LIS and then to other antennas. A schematic diagram of the system is illustrated in FIG. 12.

A model of the system is expressed as:

$$y_{m_1, m_2}(n + 1) = [h_{BL}(k, m_2)\phi(k)h_{BL}(m_1, k) + h_{en}(m_1, m_2)]x_{m_1}(n + 1) + \qquad (17)$$
$$w_{m_1, m_2}(n + 1)$$

Meanings of symbols in equation (17) are the same as the meanings of these symbols in equations (14) and (15), and the meanings of the symbols are not repeated here. The estimation of the dual-link cascaded channel from the antenna m1 to the k-th reflection unit of the LIS and then to the antenna m2 can be obtained according to equation (17), which is expressed as:

$$\hat{h}_{BL}(k, m_2)\hat{h}_{BL}(m_1, k) = \frac{y_{m_1, m_2}(n + 1) - \hat{h}_{en}(m_1, m_2)x_{m_1}(n + 1)}{x_{m_1}(n + 1)\phi(k)} \qquad (18)$$

Figure 13:
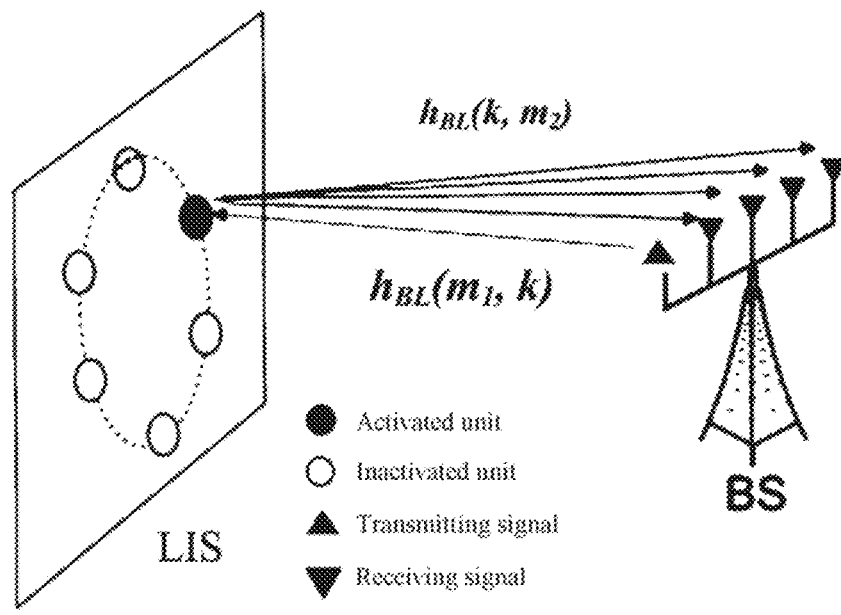
FIG. 13 is a schematic diagram of a system for estimating of the first channel based on virtual full duplex measurement.

At a next time instant (n+2), the BS controls the LIS to activate a (k+1)-th reflection unit and remaining reflection units remain turned off. The antenna m1 of the BS transmits a pilot signal. The pilot signal is reflected by the LIS and received by other antennas of the BS, to estimate dual-link cascaded channels from the antenna m1 to the (k+1)-th reflection unit of the LIS and then to other antennas. A schematic diagram of the system is as illustrated in FIG. 13.

A model of the system is expressed as:

$$y_{m_1, m_2}(n + 2) = [h_{BL}(k + 1, m_2)\phi(k + 1)h_{BL}(m_1, k + 1) + \qquad (19)$$
$$h_{en}(m_1, m_2)]x_{m_1}(n + 2) + w_{m_1, m_2}(n + 2)$$

Meanings of symbols in equation (19) are the same as the meanings of these symbols in equations (14), (15) and (17), and the meanings of the symbols are not repeated here. The estimation of the dual-link cascaded channel from the antenna m1 to the (k+1)-th reflection unit of the LIS and then to the antenna m2 can be obtained according to equation (19), which is expressed as:

$$\hat{h}_{BL}(k + 1, m_2)\hat{h}_{BL}(m_1, k + 1) = \frac{y_{m_1, m_2}(n + 2) - \hat{h}_{en}(m_1, m_2)x_{m_1}(n + 2)}{x_{m_1}(n + 2)\phi(k + 1)} \qquad (20)$$

Then, the BS controls the LIS to successively activate other reflection units and the above processes are repeated. Finally, an estimation result of the cascaded channel is finally obtained as follows:

$$\hat{h}_{BL}(k, m_2)\hat{h}_{BL}(m_1, k) \quad k = 0, 1, K, N - 1 \qquad (21)$$
$$m_2 = 0, 1, K, M - 1, \quad m_2 \neq m_1$$
$$m_1 \in S, |S| \geq 2$$

In equation (21), S represents a set of antennas of the BS.

Figure 14:
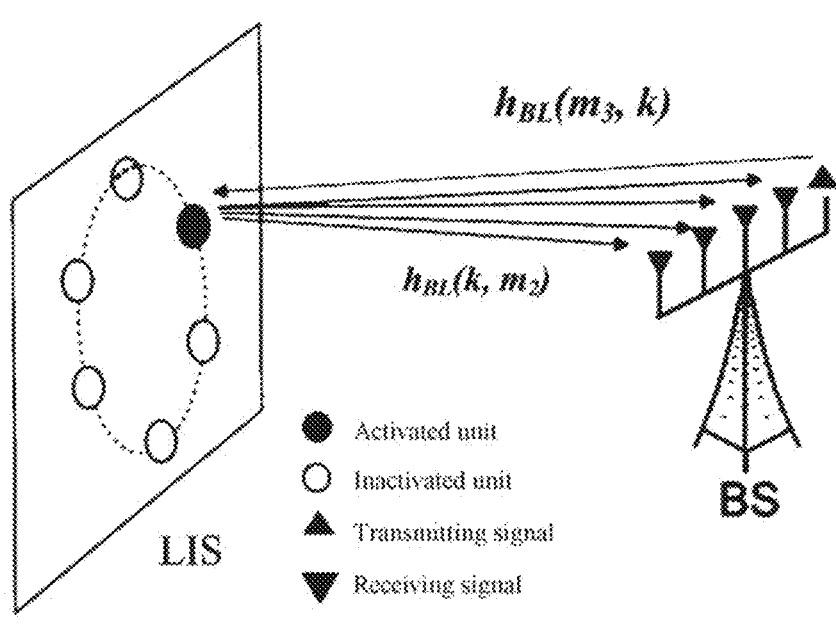
FIG. 14 is a schematic diagram of a system for estimating of the first channel based on virtual full duplex measurement.

Next, the BS selects another antenna m3 different from the antenna m1 from the set S of antennas to transmit a pilot signal. At a time instant (n+t), the BS controls the LIS to activate the k-th reflection unit and remaining reflection units remain turned off (not activated). The antenna m3 of the BS transmits a pilot signal. The pilot signal is reflected by the LIS and then is received by other antennas of the BS, to estimate dual-link cascaded channels from the antenna m3 to the k-th reflection unit of the LIS and then to other antennas. A schematic diagram of the system is illustrated in FIG. 14.

A model of the system is expressed as:

$$y_{m_3, m_2}(n + t) = [h_{BL}(k, m_2)\phi(k)h_{BL}(m_3, k) + h_{en}(m_3, m_2)]x_{m_3}(n + t) + \qquad (22)$$
$$w_{m_3, m_2}(n + t)$$

Meanings of symbols in equation (22) are the same as the meanings of these symbols in above description, and the meanings of the symbols are not repeated. $h_{en}(m_3, m_2)$ represents estimated ambient reflection in a case that all units of the LIS are turned off and a pilot signal is transmitted by using the antenna m3 of the network node and received by using other antennas of the network node. An estimation of the dual-link cascaded channel from the antenna m3 to the k-th reflection unit of the LIS and then to the antenna m2 estimated can be obtained according to equation (22), which is expressed as:

$$\hat{h}_{BL}(k, m_2)\hat{h}_{BL}(m_3, k) = \frac{y_{m_3, m_2}(n + t) - \hat{h}_{en}(m_3, m_2)x_{m_3}(n + t)}{x_{m_3}(n + t)\phi(k)} \qquad (23)$$

Similarly, the BS controls the LIS to successively activate other reflection units and the above processes are repeated. Finally, an estimation result of the cascaded channel is obtained as:

$$\hat{h}_{BL}(k, m_2)\hat{h}_{BL}(m_3, k) \quad k = 0, 1, K, N - 1 \qquad (24)$$
$$m_2 = 0, 1, K, M - 1, \quad m_2 \neq m_1$$
$$m_3 \in S, |S| \geq 2$$

Based on estimation results of all cascaded channels obtained above, elements in $H_{BL}$ are estimated as:

$$\hat{h}_{BL}(m_1, k) = \sqrt{\frac{[\hat{h}_{BL}(k, m_2)\hat{h}_{BL}(m_1, k)] \cdot [\hat{h}_{BL}(k, m_3)\hat{h}_{BL}(m_1, k)]}{\hat{h}_{BL}(k, m_2)\hat{h}_{BL}(m_3, k)}} \qquad (25)$$

Due to the reciprocity between channels, i.e., $\hat{h}_{BL}(k, m_3) = \hat{h}_{BL}(m_3, k)$, the estimated results obtained in the above steps (for example, equations (21), (24), and the like) are substituted into equation (25) to obtain $\hat{h}_{BL}(m_1, k)$.

Further, due to the reciprocity between channels, i.e., $\hat{h}_{BL}(k, m_2)=\hat{h}_{BL}(m_2, k)$, the following equation can be obtained:

$$\hat{h}_{BL}(m_2, k) = \frac{\hat{h}_{BL}(k, m_2)\hat{h}_{BL}(m_1, k)}{\hat{h}_{BL}(m_1, k)} \tag{26}$$

$\hat{h}_{BL}(m_2, k)$ is obtained through calculation based on the estimation results obtained in the above steps and the calculation result expressed as equation (25), so as to obtain the complete $H_{BL}$.

As described above, the first channel between the network node and the LIS can be obtained based on a process of virtual full duplex measurement.

Second Example

In this example, the estimation unit 101 is configured to estimate the first channel based on measurement of device to device (D2D) communication. The two terminal devices operate in a D2D mode and transmit pilot signals alternately. Hereinafter, the two terminal devices are referred to as first device and second device respectively for distinguishing.

Figure 15:
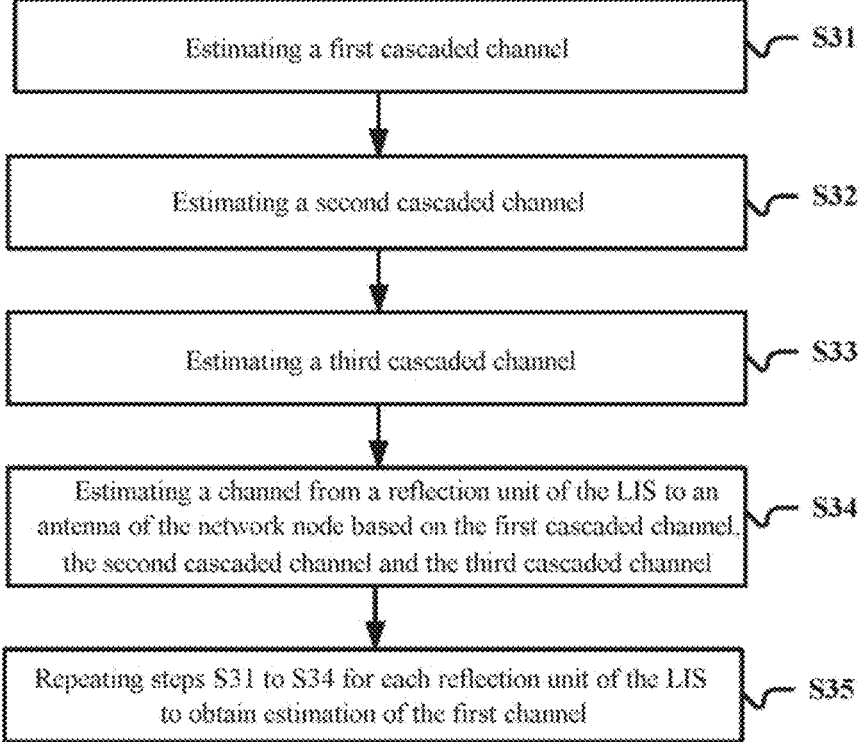
FIG. 15 is a flowchart of estimating of the first channel based on measurement of device to device communication.

FIG. 15 illustrates a flowchart of estimating of the first channel according to this example. An LIS is controlled to turn on one reflection unit. In step S31, a first device transmits a pilot signal to the LIS, an antenna of the network node receives the pilot signal reflected by the LIS, and estimates a first cascaded channel from the first device to the antenna of the network node via the reflection unit of the LIS. In step S32, a second device transmits a pilot signal to the LIS, the antenna of the network node receives the pilot signal reflected by the LIS, and estimates a second cascaded channel from the second device to the antenna of the network node via the reflection unit of the LIS. In step S33, the first device transmits a pilot signal to the LIS. The reflected pilot signal is received by the second device. The second device estimates a third cascaded channel from the first device to the second device via the reflection unit of the LIS. The network node obtains the estimated third cascaded channel from the second device. In step S34, a channel from the unit of the LIS to the antenna of the network node is estimated based on the first cascaded channel, the second cascaded channel and the third cascaded channel. In step S35, steps S31 to S34 are performed for each reflection unit of the LIS, and estimation of the first channel is obtained based on the estimated channel from each unit of the LIS to each antenna of the network node.

Figure 16:
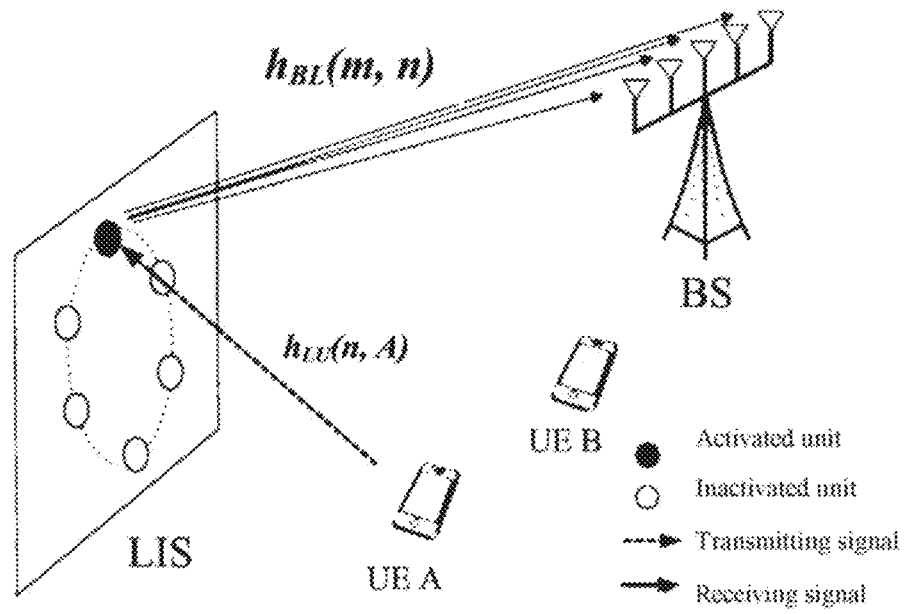
FIG. 16 is a schematic diagram of a system for estimating of the first channel based on measurement of device to device communication.

FIG. 16 illustrates a schematic diagram of a system for estimating the first channel based on measurement of D2D communication. The network node is illustrated as a base station BS. UE A and UE B perform D2D communication, and UE A and UE B each are provided with a single antenna. It is assumed that the LIS is provided with N reflection units and the BS is provided with M antennas. It should be noted that UE A and UE B may also be OAM UE, For example, as long as a single antenna is used for estimation.

The estimation of the first channel is described in detail below with reference to the schematic diagrams illustrated in FIG. 16 to FIG. 19. For example, at a time instant k, the BS controls the LIS to activate an n-th reflection unit and remaining reflection units are not activated. The UE A transmits a pilot signal. The pilot signal is reflected by the LIS, and then is received by the antenna of the BS, as illustrated in FIG. 16. The BS estimates a first cascaded channel from the UE A to respective antennas via the n-th reflection unit of the LIS based on the received pilot signal (corresponding to step S31), which is described below by taking an m-th (m=0, 1, . . . , M−1) antenna as an example.

A signal received by the m-th antenna is expressed as:

$$y_{m,A}(k) = h_{BL}(m, n)\phi(n)h_{LU}(n, A)x_A(k) + w_{m,A}(k) \tag{27}$$

In equation (27), $x_A(k)$ represents a signal transmitted by UE A, $y_{m,A}(k)$ represents a signal received by the m-th antenna, $h_{BL}(m, n)$ represents a channel between the n-th reflection unit and the m-th antenna of the BS, $h_{LU}(n, A)$ represents a channel between the UE A and the n-th reflection unit of the LIS, $\phi(n)$ represents an adjustment coefficient of the n-th reflection unit of the LIS, and $w_{m,A}(k)$ represents a noise.

The estimated first cascaded channel obtained according to equation (27) is expressed as:

$$\hat{h}_{BL}(m, n)\hat{h}_{LU}(n, A) = \frac{y_{m,A}(k)}{x_A(k)\phi(n)} \tag{28}$$

Figure 17:
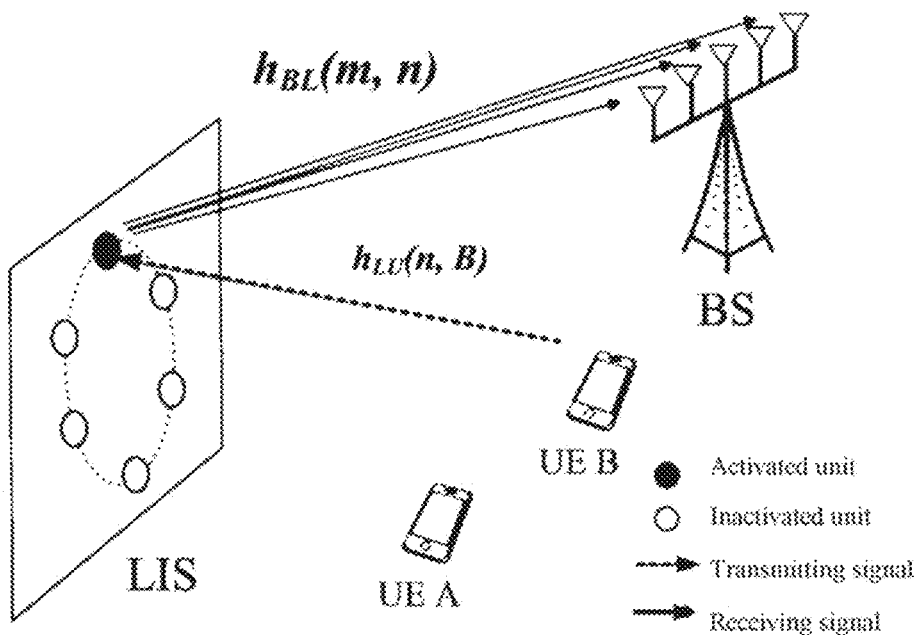
FIG. 17 is a schematic diagram of a system for estimating of the first channel based on measurement of device to device communication.

At a time instant (k+1), the UE A stops transmitting pilot signals and the UE B starts to transmit a pilot signal. The pilot signal is reflected by the LIS, and then is received by the BS, as illustrated in FIG. 17. The BS estimates a second cascaded channel from the UE B to respective antennas via the n-th reflection unit of the LIS based on the received pilot signal (corresponding to step S32), which is described below by also taking the m-th antenna as an example.

A signal received by the m-th antenna is expressed as:

$$y_{m,B}(k+1) = h_{BL}(m, n)\phi(n)h_{LU}(n, B)x_B(k+1) + w_{m,B}(k+1) \tag{29}$$

Meanings of symbols in equation (29) are the same as the meanings of these symbols in above description, and the meanings of the symbols are not repeated. $x_B(k)$ represents the signal transmitted by the UE B, $y_{m,B}(k+1)$ represents the signal received by the m-th antenna, $h_{LU}(n, B)$ represents a channel between the UE B and the n-th reflection unit of the LIS, and $w_{m,B}(k+1)$ represents a noise.

An estimated second cascaded channel obtained according to equation (29) is expressed as:

$$\hat{h}_{BL}(m, n)\hat{h}_{LU}(n, B) = \frac{y_{m,B}(k+1)}{x_B(k+1)\phi(n)} \tag{30}$$

Figure 18:
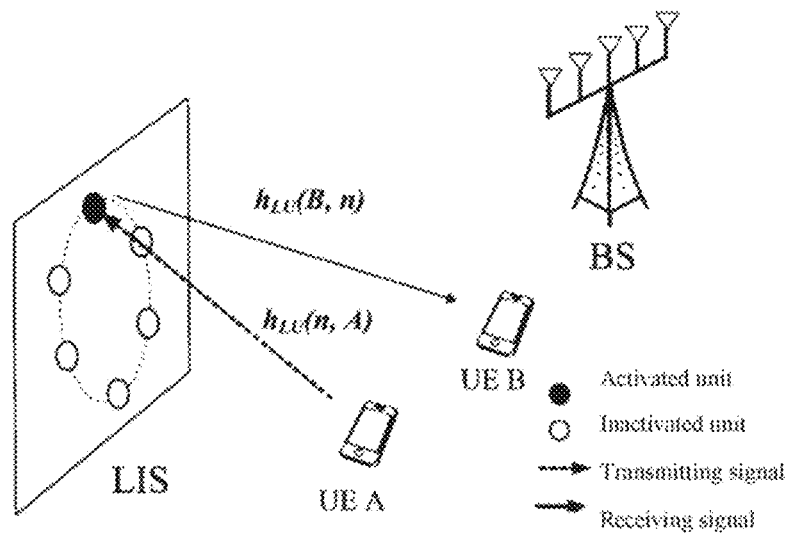
FIG. 18 is a schematic diagram of a system for estimating of the first channel based on measurement of device to device communication.

At a time instant (k+2), the UE B stops transmitting pilot signals and the UE A starts to transmit a pilot signal. The pilot signal is reflected by the LIS and then is received by the UE B, as illustrated in FIG. 18. The UE B estimates a third cascaded channel from the UE A to the UE B via the n-th reflection unit of the LIS based on the received pilot signal (corresponding to step S33).

The pilot signal received by the UE B is expressed as:

$$y_{B,A}(k+2) = h_{LU}(B, n)\phi(n)h_{LU}(n, A)x_A(k+2) + W_{B,A}(k+2) \tag{31}$$

An estimated third cascaded channel obtained according to equation (31) is expressed as:

$$\hat{h}_{LU}(B, n)\hat{h}_{LU}(n, A) = \frac{y_{B,A}(k + 2)}{x_A(k + 2)\phi(n)} \qquad (32)$$

The UE B reports, to BS, information of the third cascaded channel from the UE A to the UE B. The BS calculates a channel from the n-th reflection unit of the LIS to the m-th antenna of the BS (corresponding to step S34) as follows, where m=0, 1, . . . , M−1.

$$\hat{h}_{BL}(m, n) = \sqrt{\frac{\hat{h}_{BL}(m, n)\hat{h}_{LU}(n, A) \cdot \hat{h}_{BL}(m, n)\hat{h}_{LU}(n, B)}{\hat{h}_{LU}(B, n)\hat{h}_{LU}(n, A)}} \qquad (33)$$

Due to the reciprocity between channels, $\hat{h}_{LU}(n, B)=\hat{h}_{LU}$ (B,n).

Figure 19:
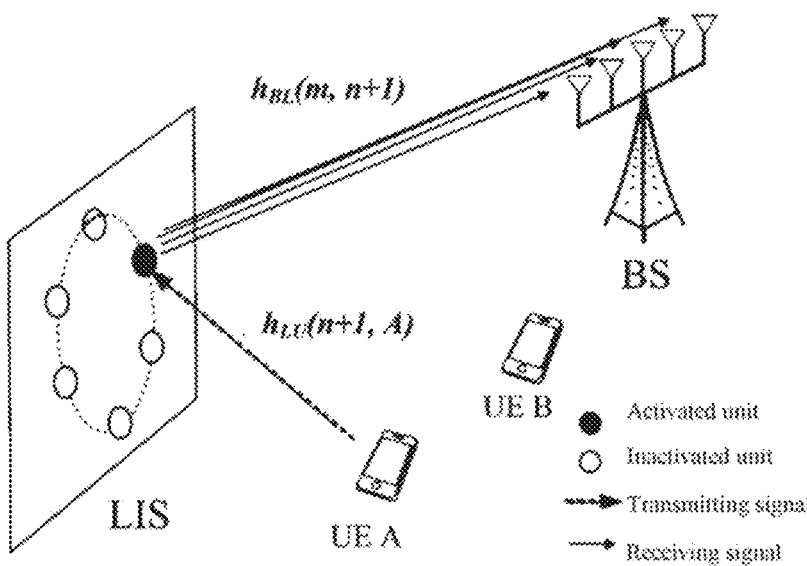
FIG. 19 is a schematic diagram of a system for estimating of the first channel based on measurement of device to device communication.
Figure 20:
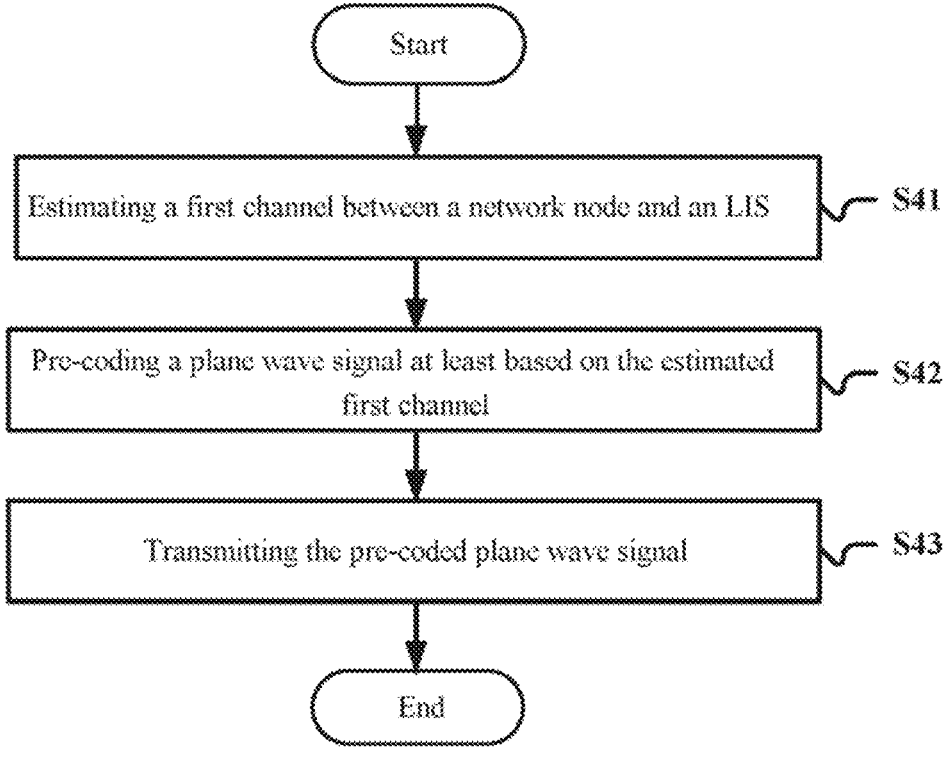
FIG. 20 is a flowchart of a method for wireless communications according to an embodiment of the present disclosure.

Next, the BS controls the LIS to activate other reflection units successively, as illustrated in FIG. 19. Then the above steps are repeated to finally obtain a complete estimation of the first channel, for example, respective elements in the matrix $H_{BL}$.

It can be seen that in the third example, the uplink signal is used for channel estimation. Based on the reciprocity of the uplink channel and the downlink channel, the estimated result is also applicable to the downlink channel from the network node to the LIS.

Three examples in which the estimation unit 101 estimates the first channel are described above, and it should be understood that the examples are not restrictive.

Third Embodiment

In the above description of embodiments of the electronic apparatuses for wireless communications, it is apparent that some processing and methods are further disclosed. In the following, a summary of the methods are described without repeating details that are described above. However, it should be noted that although the methods are disclosed when describing the electronic apparatuses for wireless communications, the methods are unnecessary to adopt those components or to be performed by those components described above. For example, implementations of the electronic apparatuses for wireless communications may be partially or completely implemented by hardware and/or firmware. Methods for wireless communications to be discussed blow may be completely implemented by computer executable programs, although these methods may be implemented by the hardware and/or firmware for implementing the electronic apparatuses for wireless communications.

FIG. 19 is a flowchart of a method for wireless communications according to an embodiment of the present disclosure. The method includes: estimating a first channel between a network node and an LIS (S41); pre-coding a plane wave signal transmitted by the network node at least based on the estimated first channel, to cause a channel model between the network node and a network terminal to be equivalent to an OAM channel model between the LIS and the network terminal (S42); and transmitting the pre-coded plane wave signal (S43). The method, for example, may be performed at the network node side.

For example, reflection units of the LIS may be configured as a uniform circular array, and a reflection coefficient matrix of the LIS may be set as an identity matrix.

In step S42, a pilot signal may be pre-coded based on the estimated first channel, so that the network terminal determines an effective channel parameter between the LIS and the network terminal based on reception of the pre-coded pilot signal. The network terminal demodulates data based on the effective channel parameter.

In addition, in a case that there is a light of sight between the network node and the network terminal, the method further includes estimating a light of sight channel between the network node and the network terminal and performing pre-coding based on the estimated light of sight channel in step S42 to eliminate an influence of the plane wave signal transmitted through the light of sight. For example, pre-coding may be performed using a dirty paper algorithm or a block diagonalization algorithm. In a case of performing pre-coding using the block diagonalization algorithm, the pre-coding includes first pre-coding and second pre-coding. The first pre-coding is used to eliminate the influence of the plane wave signal transmitted through the light of sight. For example, a pre-coding matrix for the first pre-coding is a null space of a channel matrix of the eliminated light of sight channel.

In the case that there is a light of sight between the network node and the network terminal, a pilot signal is pre-coded based on the estimated first channel and the estimated light of sight channel in step S42, so that the network terminal determines the effective channel parameter between the LIS and the network terminal based on reception of the pre-coded pilot signal. The network terminal demodulates data based on the effective channel parameter.

As an example, the light of sight channel can be estimated as follows. All reflection units of the LIS are turned off. Pilot signals are transmitted to the network terminal using respective antennas of the network nodes successively, and the network terminal measures the pilot signals and estimates the light of sight channel based on a measurement result. The estimated light of sight channel is obtained from the network terminal.

In the first example, the first channel may be estimated using a dump access point. The dump access point is arranged within a range not exceeding a predetermined distance from the LIS. For example, the first channel is estimated using the dump access point by: controlling the LIS to turn on one reflection unit and turn off other reflection units; controlling the dump access point to transmit a pilot signal to the LIS; receiving the pilot signal reflected by the LIS and performing channel estimation; and performing the above steps for each reflection unit of the LIS to complete the estimation of the first channel. Details are as described above with reference to FIG. 8.

In the second example, the first channel may be estimated based on virtual full duplex measurement. For example, the first channel is estimated based on the virtual full duplex measurement by: turning off all reflection units of the LIS, transmitting a pilot signal using a first antenna of the network node and receiving the pilot signal using other antennas of the network node, to estimate ambient reflection; for each antenna of the network node, controlling the LIS to successively turn on respective reflection units, transmitting a pilot signal using the antenna of the network node and receiving the pilot signal using other antennas of the network node, to estimate dual-link cascaded channels from the antenna to other antennas via the reflection unit of the LIS based on the estimated ambient reflection; and estimating the first channel based on all the estimated dual-link cascaded channels. Details are as described above with reference to FIG. 10.

In the third example, the first channel may be estimated based on measurement of D2D communication. For example, the first channel is estimated based on the measurement of the D2D communication by: controlling the LIS to successively turn on respective reflection units; a first device transmitting a pilot signal to the LIS, an antenna of the network node receiving the pilot signal reflected by the LIS and estimating a first cascaded channel from the first device to the antenna of the network node via the reflection unit of the LIS; a second device transmitting a pilot signal, and the antenna of the network node receiving the pilot signal reflected by the LIS and estimating a second cascaded channel from the second device to the antenna of the network node via the reflection unit of the LIS; the first device transmitting a pilot signal to the LIS, the second device receiving the reflected pilot signal, the second device estimating a third cascaded channel from the first device to the second device via the reflection unit of the LIS, and obtaining the estimated third cascaded channel from the second device; and estimating a channel from the reflection unit of the LIS to the antenna of the network node based on the first cascaded channel, the second cascaded channel and the third cascaded channel. In addition, the estimation of the first channel based on the measurement of the D2D communication further includes: obtaining estimation of the first channel based on estimated channels from respective reflection units of the LIS to respective antennas of the network node. Details are as described above with reference to FIG. 15.

The method corresponds to the electronic apparatus 100 described in the first embodiment and the second embodiment. Details can be with reference to the above description, and are not repeated here.

The technology of the present disclosure is applicable to various products.

The electronic apparatus 100 may be implemented as various types of base stations or TRPs. The base stations may be implemented as any type of evolved node B (eNB) or gNB (5G base station). The eNB includes a macro eNB and a small eNB, for example. The small eNB may be an eNB such as a pico eNB, a micro eNB and a home (femto) eNB that covers a cell smaller than a macro cell. The situation is similar to the gNB. Alternatively, the base station may also be implemented as a base station of any other type, such as a NodeB and a base transceiver station (BTS). The base station may include a main body (that is also referred to as a base station device) configured to control wireless communications, and one or more remote radio heads (RRH) arranged in a different place from the main body. In addition, various types of user equipment each may operate as the base station by performing functions of the base station temporarily or semi-permanently.

Application Examples Regarding a Base Station

First Application Example

Figure 21:
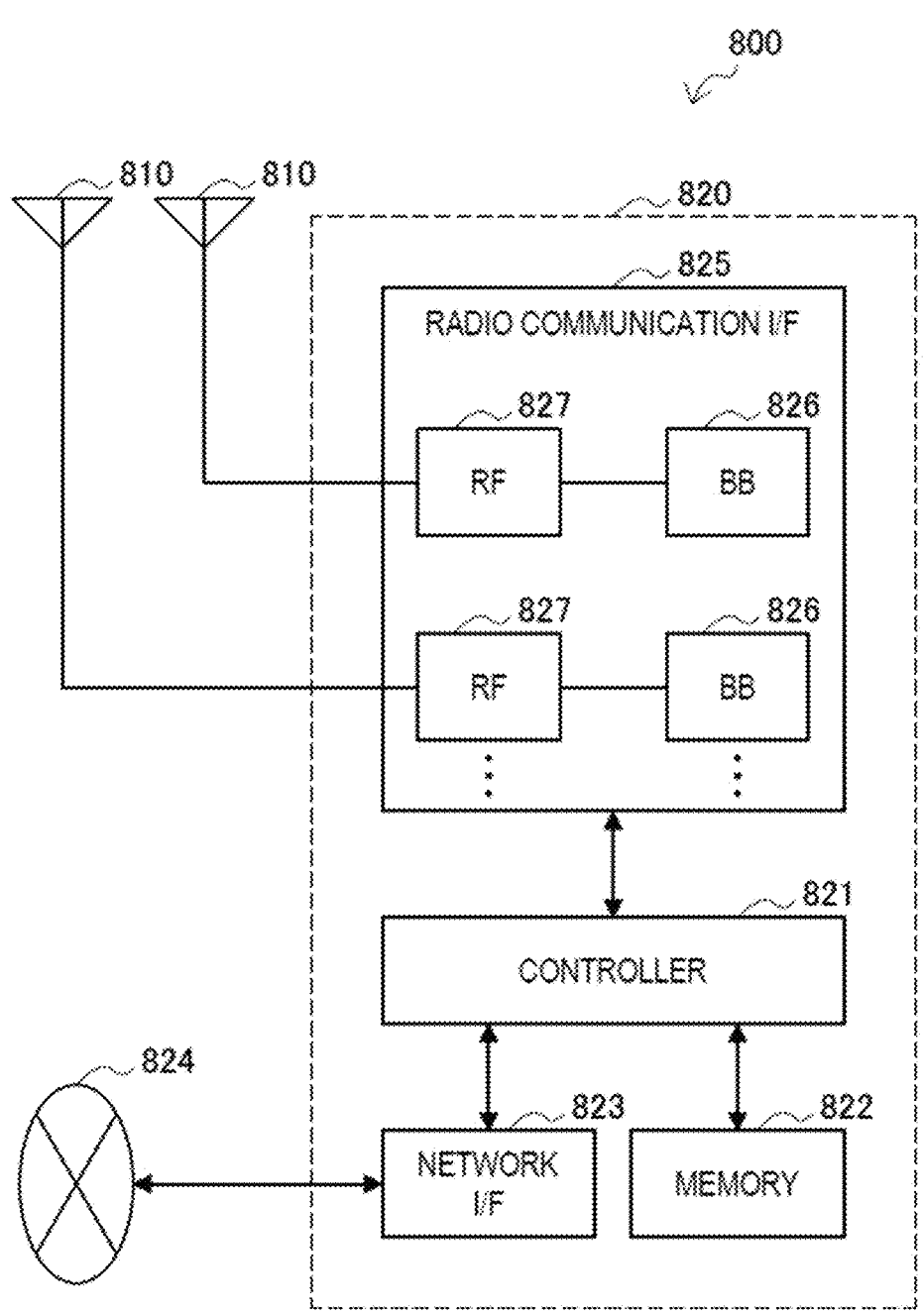
FIG. 21 is a block diagram showing a first example of an exemplary configuration of an eNB or gNB to which the technology of the present disclosure may be applied.

FIG. 21 is a block diagram illustrating a first example of an exemplary configuration of an eNB or gNB to which the technology according to the present disclosure may be applied. It should be noted that the following description is given by taking the eNB as an example, which is also applicable to the gNB. An eNB 800 includes one or more antennas 810 and a base station apparatus 820. The base station apparatus 820 and each of the antennas 810 may be connected to each other via a radio frequency (RF) cable.

Each of the antennas 810 includes a single or multiple antennal elements (such as multiple antenna elements included in a multiple-input multiple-output (MIMO) antenna), and is used for the base station apparatus 820 to transmit and receive wireless signals. As illustrated in FIG. 21, the eNB 800 may include the multiple antennas 810. For example, the multiple antennas 810 may be compatible with multiple frequency bands used by the eNB 800. Although FIG. 21 illustrates the example in which the eNB 800 includes the multiple antennas 810, the eNB 800 may include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as resource control, radio bearer control, mobility management, admission control and scheduling. The control may be performed in corporation with an eNB or a core network node in the vicinity. The memory 822 includes a RAM and a ROM, and stores a program executed by the controller 821 and various types of control data (such as a terminal list, transmission power data and scheduling data).

The network interface 823 is a communication interface for connecting the base station apparatus 820 to a core network 824. The controller 821 may communicate with a core network node or another eNB via the network interface 823. In this case, the eNB 800, and the core network node or another eNB may be connected to each other via a logic interface (such as an SI interface and an X2 interface). The network interface 823 may also be a wired communication interface or a wireless communication interface for wireless backhaul. In a case that the network interface 823 is a wireless communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and perform various types of signal processing of layers (such as L1, Media Access Control (MAC), Radio Link Control (RLC), and a Packet Data Convergence Protocol (PDCP)). The BB processor 826 may have a part or all of the above-described logical functions, to replace the controller 821. The BB processor 826 may be a memory storing communication control programs, or a module including a processor and a related circuit configured to execute the programs. Updating the program may allow the functions of the BB processor 826 to be changed. The module may be a card or a blade inserted into a slot of the base station apparatus 820. Alternatively, the module may be a chip mounted on the card or the blade. Meanwhile, the RF circuit 827 may include, for example, a mixer, a filter, and an amplifier, and transmits and receives wireless signals via the antenna 810.

As illustrated in FIG. 21, the radio communication interface 825 may include multiple BB processors 826. For example, the multiple BB processors 826 may be compatible with multiple frequency bands used by the eNB 800. The radio communication interface 825 may include multiple RF circuits 827, as illustrated in FIG. 21. For example, the multiple RF circuits 827 may be compatible with multiple antenna elements. Although FIG. 21 illustrates the example in which the radio communication interface 825 includes multiple BB processors 826 and multiple RF circuits 827, the radio communication interface 825 may include a single BB processor 826 and a single RF circuit 827.

In the eNB 800 illustrated in FIG. 21, the communication unit 103 and the transceiver of the electronic apparatus 100 may be implemented by the radio communication interface 825. At least a part of functions may be implemented by the controller 821. For example, the controller 821 may pre-code the plane wave signal by performing functions of the estimation unit 101, the pre-coding unit 102 and the communication unit 103, to achieve OAM communication between the network terminal supporting OAM communication and the network node not provided with OAM antenna by means of the LIS.

Second Application Example

Figure 22:
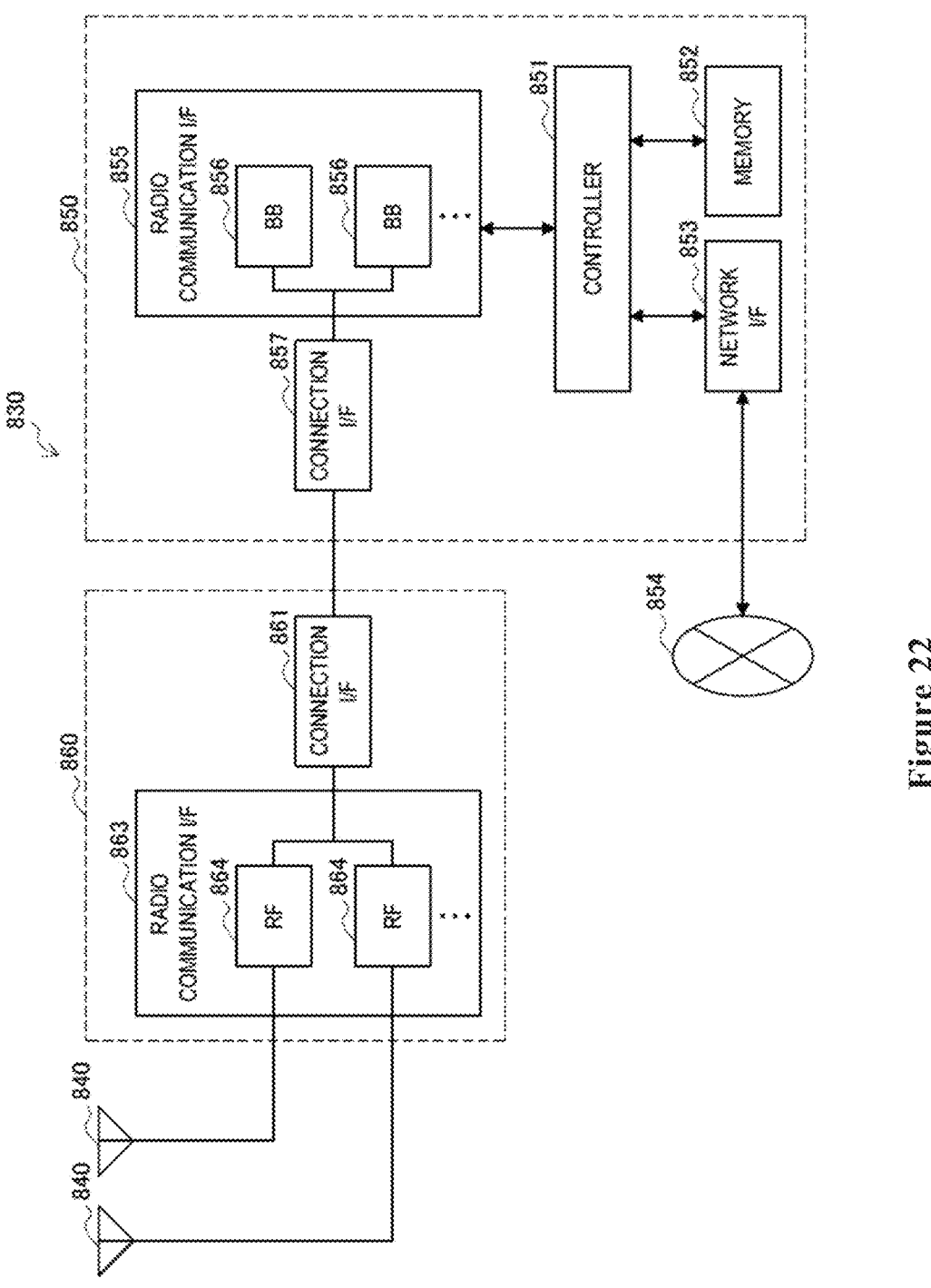
FIG. 22 is a block diagram showing a second example of an exemplary configuration of an eNB or gNB to which the technology of the present disclosure may be applied.

FIG. 22 is a block diagram illustrating a second example of an exemplary configuration of an eNB or gNB to which the technology according to the present disclosure may be applied. It should be noted that the following description is given by taking the eNB as an example, which is also applied to the gNB. An eNB 830 includes one or more antennas 840, a base station apparatus 850, and an RRH 860. The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As illustrated in FIG. 22, the eNB 830 may include multiple antennas 840. For example, the multiple antennas 840 may be compatible with multiple frequency bands used by the eNB 830. Although FIG. 22 illustrates the example in which the eNB 830 includes multiple antennas 840, the eNB 830 may include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 21.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 21, except that the BB processor 856 is connected to an RF circuit 864 of the RRH 860 via the connection interface 857. As illustrated in FIG. 22, the radio communication interface 855 may include multiple BB processors 856. For example, the multiple BB processors 856 may be compatible with multiple frequency bands used by the eNB 830. Although FIG. 22 illustrates the example in which the radio communication interface 855 includes multiple BB processors 856, the radio communication interface 855 may include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, an RF circuit 864. The RF circuit 864 may include, for example, a mixer, a filter and an amplifier, and transmits and receives wireless signals via the antenna 840. The radio communication interface 863 may include multiple RF circuits 864, as illustrated in FIG. 22. For example, the multiple RF circuits 864 may support multiple antenna elements. Although FIG. 22 illustrates the example in which the radio communication interface 863 includes multiple RF circuits 864, the radio communication interface 863 may include a single RF circuit 864.

In the eNB 830 illustrated in FIG. 22, the communication unit 103 and the transceiver of the electronic apparatus 100 may be implemented by the radio communication interface 855 and/or the radio communication interface 863. At least a part of functions may be implemented by the controller 821. For example, the controller 851 may pre-code the plane wave signal by performing functions of the estimation unit 101, the pre-coding unit 102 and the communication unit 103, to achieve OAM communication between the network terminal supporting OAM communication and the network node not provided with OAM antenna by means of the LIS.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 2300 shown in FIG. 23) from a storage medium or network, wherein the computer is capable of implementing various functions when installed with various programs.

Figure 23:
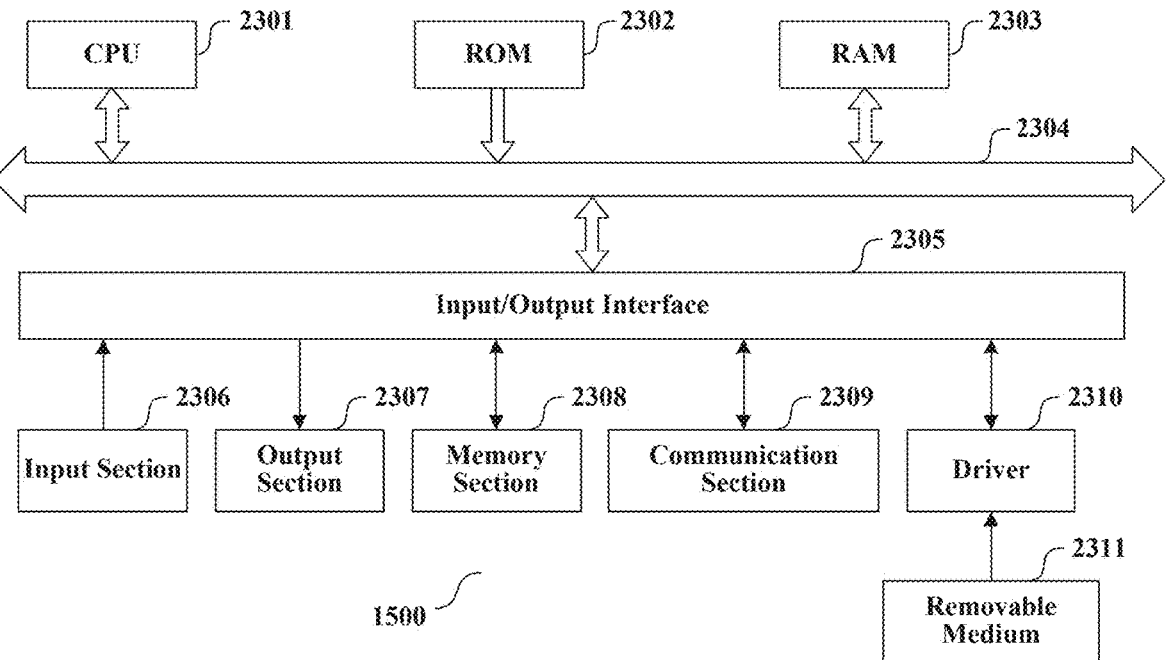
FIG. 23 is a block diagram of an exemplary block diagram illustrating the structure of a general purpose personal computer capable of realizing the method and/or device and/or system according to the embodiments of the present disclosure.

In FIG. 23, a central processing unit (CPU) 2301 executes various processing according to a program stored in a read-only memory (ROM) 2302 or a program loaded to a random access memory (RAM) 2303 from a memory section 2308. The data needed for the various processing of the CPU 2301 may be stored in the RAM 2303 as needed. The CPU 2301, the ROM 2302 and the RAM 2303 are linked with each other via a bus 2304. An input/output interface 2305 is also linked to the bus 2304.

The following components are linked to the input/output interface 2305: an input section 2306 (including keyboard, mouse and the like), an output section 2307 (including displays such as a cathode ray tube (CRT), a liquid crystal display (LCD), a loudspeaker and the like), a memory section 2308 (including hard disc and the like), and a communication section 2309 (including a network interface card such as a LAN card, modem and the like). The communication section 2309 performs communication processing via a network such as the Internet. A driver 2310 may also be linked to the input/output interface 2305, if needed. If needed, a removable medium 2311, for example, a magnetic disc, an optical disc, a magnetic optical disc, a semiconductor memory and the like, may be installed in the driver 2310, so that the computer program read therefrom is installed in the memory section 2308 as appropriate.

In the case where the foregoing series of processing is achieved through software, programs forming the software are installed from a network such as the Internet or a memory medium such as the removable medium 2311.

It should be appreciated by those skilled in the art that the memory medium is not limited to the removable medium 2311 shown in FIG. 23, which has program stored therein and is distributed separately from the apparatus so as to provide the programs to users. The removable medium 2311 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 2302 and the memory section 2308 in which programs are stored, and can be distributed to users along with the device in which they are incorporated.

To be further noted, in the apparatus, method and system according to the present disclosure, the respective components or steps can be decomposed and/or recombined. These decompositions and/or re-combinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a (n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus for wireless communications, comprising:
    at least one processor; and
    at least one memory including computer program code, where the at least one memory and the computer program code are configured, with the at least one processor, to cause the electronic apparatus to:
    estimate a first channel between a network node and an intelligent reflecting surface;
    pre-code a plane wave signal transmitted by the network node at least based on the estimated first channel, to cause a channel model between the network node and a network terminal to be equivalent to an orbital angular momentum channel model between the intelligent reflecting surface and the network terminal; and
    transmit the pre-coded plane wave signal,
    wherein in a case that there is a light of sight between the network node and the network terminal, the at least one memory and the computer program code are configured, with the at least one processor, to cause the electronic apparatus to estimate a light of sight channel between the network node and the network terminal and perform pre-coding based on the estimated light of sight channel to eliminate an influence of the plane wave signal transmitted through the light of sight, and
    wherein in a case of said performing the pre-coding using a block diagonalization algorithm, the pre-coding comprises a first pre-coding and a second pre-coding, where the first pre-coding is used to eliminate the influence of the plane wave signal transmitted through the light of sight.

2. The electronic apparatus according to claim 1, wherein the at least one memory and the computer program code are configured, with the at least one processor, to cause the electronic apparatus to perform the pre-coding using a dirty paper algorithm and the block diagonalization algorithm.

3. The electronic apparatus according to claim 2, wherein a pre-coding matrix for the first pre-coding is a Null space of a channel matrix of the estimated light of sight channel.

4. The electronic apparatus according to claim 1, wherein the at least one memory and the computer program code are further configured, with the at least one processor, to cause the electronic apparatus to pre-code a pilot signal at least based on the estimated first channel, so that the network terminal determines an effective channel parameter between the intelligent reflecting surface and the network terminal based on reception of the pre-coded pilot signal, wherein the network terminal demodulates data based on the effective channel parameter.

5. The electronic apparatus according to claim 1, wherein in the case that there is the light of sight between the network node and the network terminal, the at least one memory and the computer program code are configured, with the at least one processor, to cause the electronic apparatus to pre-code a pilot signal based on the estimated first channel and the estimated light of sight channel, so that the network terminal determines an effective channel parameter between the intelligent reflecting surface and the network terminal based on reception of the pre-coded pilot signal, wherein the network terminal demodulates data based on the effective channel parameter.

6. The electronic apparatus according to claim 1, wherein reflection units of the intelligent reflecting surface are configured as a uniform circular array.

7. The electronic apparatus according to claim 6, wherein the at least one memory and the computer program code are configured, with the at least one processor, to cause the electronic apparatus to set a reflection coefficient matrix of the intelligent reflecting surface to be an identity matrix.

8. The electronic apparatus according to claim 1, wherein the at least one memory and the computer program code are configured, with the at least one processor, to cause the electronic apparatus to estimate the light of sight channel by:

turning off all reflection units of the intelligent reflecting surface;

transmitting pilot signals to the network terminal using respective antennas of the network node successively, the network terminal measuring the pilot signals and estimating the light of sight channel based on measurement results; and obtaining the estimated light of sight channel from the network terminal.

9. The electronic apparatus according to claim 1, wherein the at least one memory and the computer program code are configured, with the at least one processor, to cause the electronic apparatus to estimate the first channel using a dump access point arranged within a range not exceeding a predetermined distance from the intelligent reflecting surface.

10. The electronic apparatus according to claim 9, wherein the at least one memory and the computer program code are configured, with the at least one processor, to cause the electronic apparatus to estimate the first channel by:

controlling the intelligent reflecting surface to turn on a reflection unit and turn off remaining reflection units;

controlling the dump access point to transmit a pilot signal to the intelligent reflecting surface;

receiving the pilot signal reflected by the intelligent reflecting surface and performing channel estimation; and performing the above mentioned steps for each reflection unit of the intelligent reflecting surface, so as to complete the estimating of the first channel.

11. The electronic apparatus according to claim 1, wherein the at least one memory and the computer program code are configured, with the at least one processor, to cause the electronic apparatus to estimate the first channel based on virtual full duplex measurement.

12. The electronic apparatus according to claim 11, wherein the at least one memory and the computer program code are configured, with the at least one processor, to cause the electronic apparatus to estimate the first channel by:

turning off all reflection units of the intelligent reflecting surface, transmitting a pilot signal using a first antenna of the network node and receiving the pilot signal using remaining antennas of the network node, to estimate ambient reflection;

for each antenna of the network node, controlling the intelligent reflecting surface to turn on respective reflection units successively, transmitting a pilot signal using the antenna of the network node and receiving the pilot signal using the remaining antennas of the network node, to estimate dual-link cascaded channels from the antenna to the remaining antennas via the reflection unit of the intelligent reflecting surface based on the estimated ambient reflection; and estimating the first channel based on all the estimated dual-link cascaded channels.

13. The electronic apparatus according to claim 1, wherein the at least one memory and the computer program code are configured, with the at least one processor, to cause the electronic apparatus to estimate the first channel based on measurement of device to device communication.

14. The electronic apparatus according to claim 13, wherein the at least one memory and the computer program code are configured, with the at least one processor, to cause the electronic apparatus estimate the first channel by:

controlling the intelligent reflecting surface to successively turn on respective reflection units;

a first device transmitting a pilot signal to the intelligent reflecting surface, an antenna of the network node receiving the pilot signal reflected by the reflection unit of the intelligent reflecting surface and estimating a first cascaded channel from the first device to the antenna of the network node via the reflection unit of the intelligent reflecting surface;

a second device transmitting a pilot signal to the intelligent reflecting surface, an antenna of the network node receiving the pilot signal reflected by the reflection unit of the intelligent reflecting surface and estimating a second cascaded channel from the second device to the antenna of the network node via the reflection unit of the intelligent reflecting surface;

the first device transmitting a pilot signal to the intelligent reflecting surface, the reflected pilot signal being received by the second device, the second device estimating a third cascaded channel from the first device to the second device via the reflection unit of the intelligent reflecting surface, and the processing circuitry obtaining the estimated third cascaded channel from the second device;

estimating a channel from the reflection unit of the intelligent reflecting surface to the antenna of the network node based on the first cascaded channel, the second cascaded channel and the third cascaded channel; and obtaining estimation of the first channel based on estimated channels from respective reflection units of the intelligent reflecting surface to respective antennas of the network node.

15. A method for wireless communications, comprising:

estimating a first channel between a network node and an intelligent reflecting surface;

pre-coding a plane wave signal transmitted by the network node at least based on the estimated first channel, to cause a channel model between the network node and a network terminal to be equivalent to an orbital angular momentum channel model between the intelligent reflecting surface and the network terminal; and transmitting the pre-coded plane wave signal, wherein said estimating the first channel includes:

turning off all reflection units of the intelligent reflecting surface, transmitting a pilot signal using a first antenna of the network node and receiving the pilot signal using remaining antennas of the network node, to estimate ambient reflection, for each antenna of the network node, controlling the intelligent reflecting surface to turn on respective reflection units successively, transmitting a pilot signal using the antenna of the network node and receiving the pilot signal using the remaining antennas of the network node, to estimate dual-link cascaded channels from the antenna to the remaining antennas via the reflection unit of the intelligent reflecting surface based on the estimated ambient reflection, and estimating the first channel based on all the estimated dual-link cascaded channels.

16. The method for wireless communications according to claim 15, further comprising, in a case that there is a light of sight between the network node and the network terminal, estimating a light of sight channel between the network node and the network terminal and performing pre-coding based on the estimated light of sight channel to eliminate an influence of the plane wave signal transmitted through the light of sight.

17. A non-transitory computer-readable storage medium storing computer-executable instructions, which when executed by one or more processors, cause the one or more processors to implement a method for wireless communications comprising:

estimating a first channel between a network node and an intelligent reflecting surface; and pre-coding a plane wave signal transmitted by the network node at least based on the estimated first channel, to cause a channel model between the network node and a network terminal to be equivalent to an orbital angular momentum channel model between the intelligent reflecting surface and the network terminal, wherein said estimating the first channel includes:

controlling the intelligent reflecting surface to successively turn on respective reflection units, a first device transmitting a pilot signal to the intelligent reflecting surface, an antenna of the network node receiving the pilot signal reflected by the reflection unit of the intelligent reflecting surface and estimating a first cascaded channel from the first device to the antenna of the network node via the reflection unit of the intelligent reflecting surface, a second device transmitting a pilot signal to the intelligent reflecting surface, an antenna of the network node receiving the pilot signal reflected by the reflection unit of the intelligent reflecting surface and estimating a second cascaded channel from the second device to the antenna of the network node via the reflection unit of the intelligent reflecting surface, the first device transmitting a pilot signal to the intelligent reflecting surface, the reflected pilot signal being received by the second device, the second device estimating a third cascaded channel from the first device to the second device via the reflection unit of the intelligent reflecting surface, and the processing circuitry obtaining the estimated third cascaded channel from the second device, estimating a channel from the reflection unit of the intelligent reflecting surface to the antenna of the network node based on the first cascaded channel, the second cascaded channel and the third cascaded channel, and obtaining estimation of the first channel based on estimated channels from respective reflection units of the intelligent reflecting surface to respective antennas of the network node.

18. The non-transitory computer-readable storage medium according to claim 17, wherein the method further comprises, in a case that there is a light of sight between the network node and the network terminal, estimating a light of sight channel between the network node and the network terminal and performing pre-coding based on the estimated light of sight channel to eliminate an influence of the plane wave signal transmitted through the light of sight.

* * * * *